(12) United States Patent
Ukon

(10) Patent No.: US 7,991,410 B2
(45) Date of Patent: Aug. 2, 2011

(54) COMMUNICATION SYSTEM

(75) Inventor: Tsutomo Ukon, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 933 days.

(21) Appl. No.: 11/898,325

(22) Filed: Sep. 11, 2007

(65) Prior Publication Data
US 2008/0064419 A1 Mar. 13, 2008

(30) Foreign Application Priority Data
Sep. 12, 2006 (JP) .................................. 2006-246832

(51) Int. Cl.
- H04W 4/00 (2009.01)
- H04M 3/42 (2006.01)
- H04B 7/00 (2006.01)

(52) U.S. Cl. ........................ 455/463; 455/416; 455/41.2

(58) Field of Classification Search .................. 379/242; 455/416, 557, 462
See application file for complete search history.

(56) References Cited

U.S. PATENT DOCUMENTS

| 7,406,167 B2 * | 7/2008 | Ooki | 379/242 |
| 2003/0157929 A1 * | 8/2003 | Janssen et al. | 455/416 |

FOREIGN PATENT DOCUMENTS

| JP | A-05-308669 | 11/1993 |
| JP | A-05-336214 | 12/1993 |
| JP | A-08-116570 | 5/1996 |
| JP | A-2000-244954 | 9/2000 |
| JP | A-2000-261543 | 9/2000 |
| JP | A-2001-285934 | 10/2001 |
| JP | A-2002-186028 | 6/2002 |
| JP | A-2004-120209 | 4/2004 |
| JP | A-2004-336589 | 11/2004 |

* cited by examiner

Primary Examiner — Patrick N Edouard
Assistant Examiner — Kiet Doan
(74) Attorney, Agent, or Firm — Oliff & Berridge PLC

(57) ABSTRACT

A communication system, having a base unit, which is communicably connected to an external communication device, and at least one extension unit, which is communicable with the base unit and with the other extension unit and the external communication device via the base unit, is provided. The base unit includes an information collecting system to collect information of the at least one extension unit in the communication system. The at least one extension unit includes an information obtaining system to obtain the information from the base unit and an indicating system to indicate presence and communication status of each of the at least one extension unit in the communication system based on the obtained information individually on an extension unit basis.

9 Claims, 21 Drawing Sheets

| STATUS OF EXT. #1 | STATUS OF EXT. #2 | STATUS OF EXT. #3 | STATUS OF EXT. #4 |
|---|---|---|---|

0 : STANDBY/IN SERVICE RANGE
1 : EXTERNAL CALL
2 : INTERNAL CALL
3 : OUT OF RANGE
FF : UNREGISTERED

EXT. #1 : STANDBY, EXT. #2 : EXTERNAL CALL,
EXT. #3 : INTERNAL CALL, EXT. #4 : OUT OF RANGE

| 0 | 1 | 2 | 3 |
|---|---|---|---|

EXT. #1 & #2 : INTERNAL CALL, EXT. #3 & #4 : UNREGISTERED

| 2 | 2 | FF | FF |
|---|---|---|---|

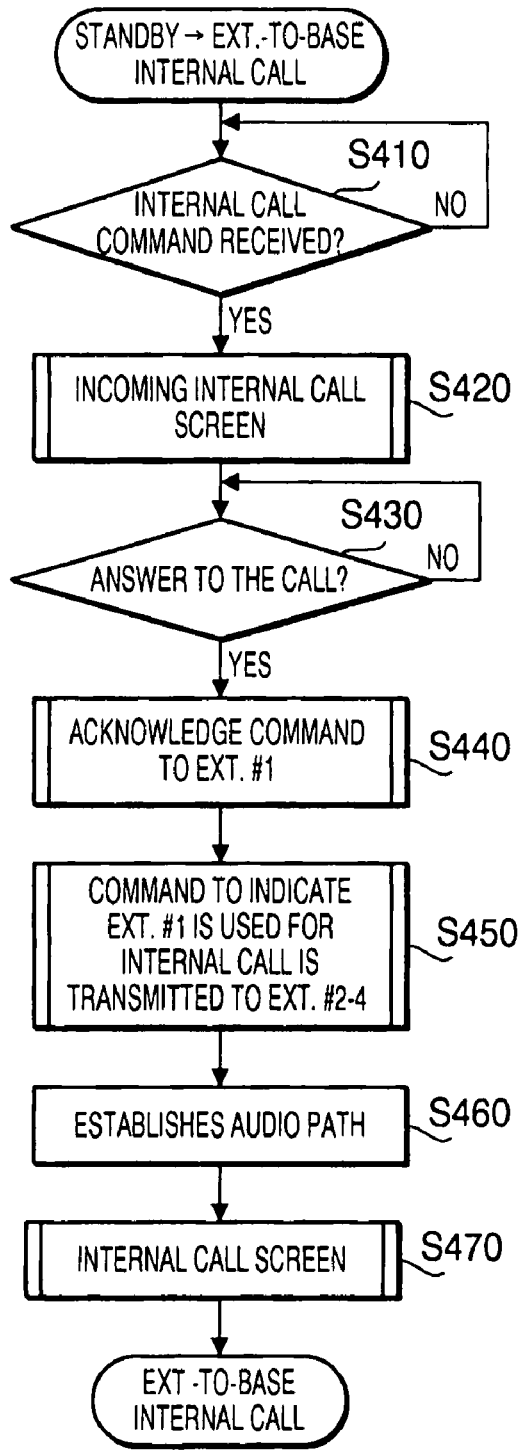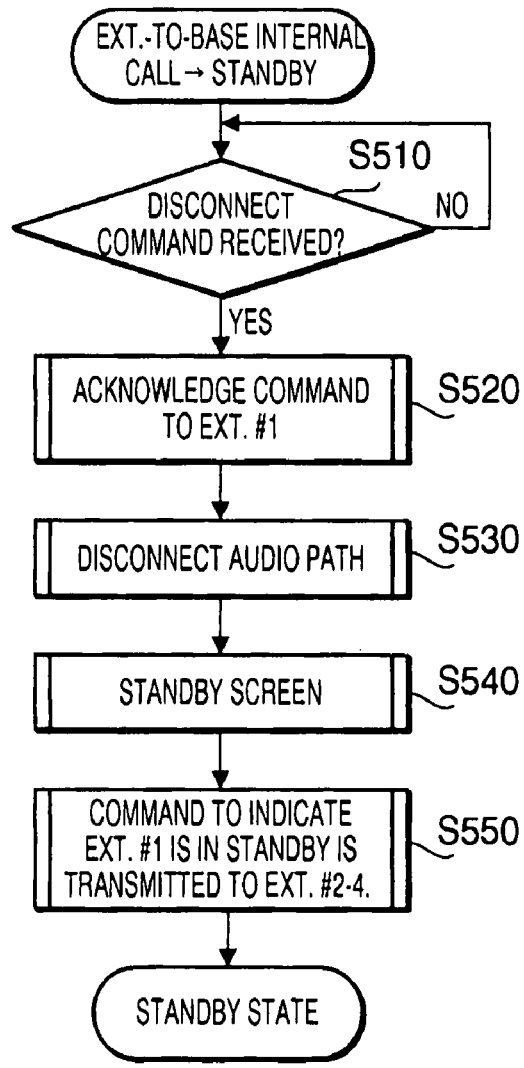
FIG.8A
FIG.8B

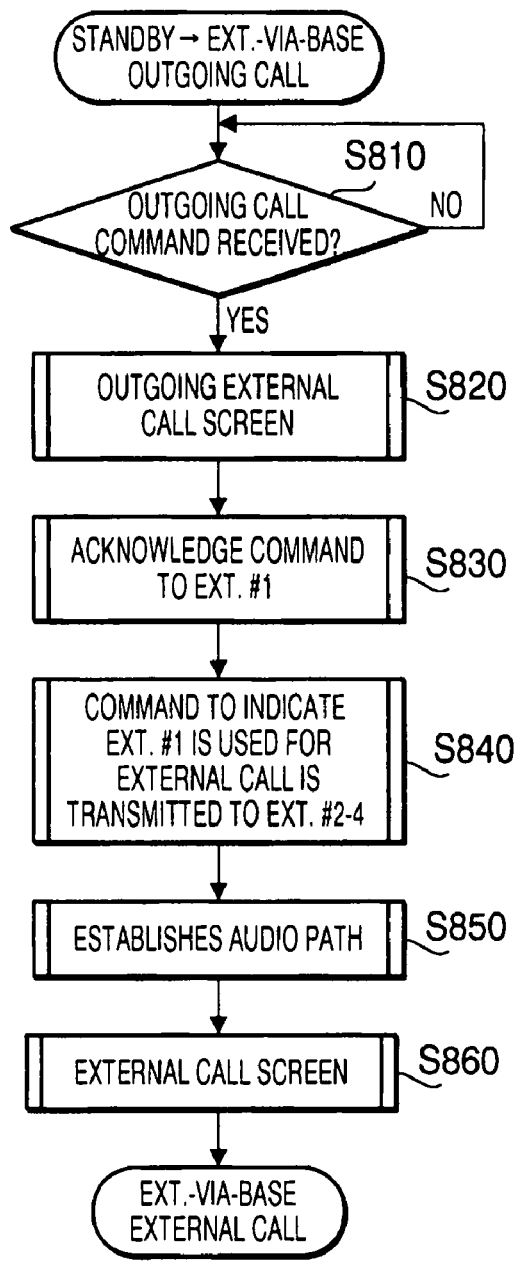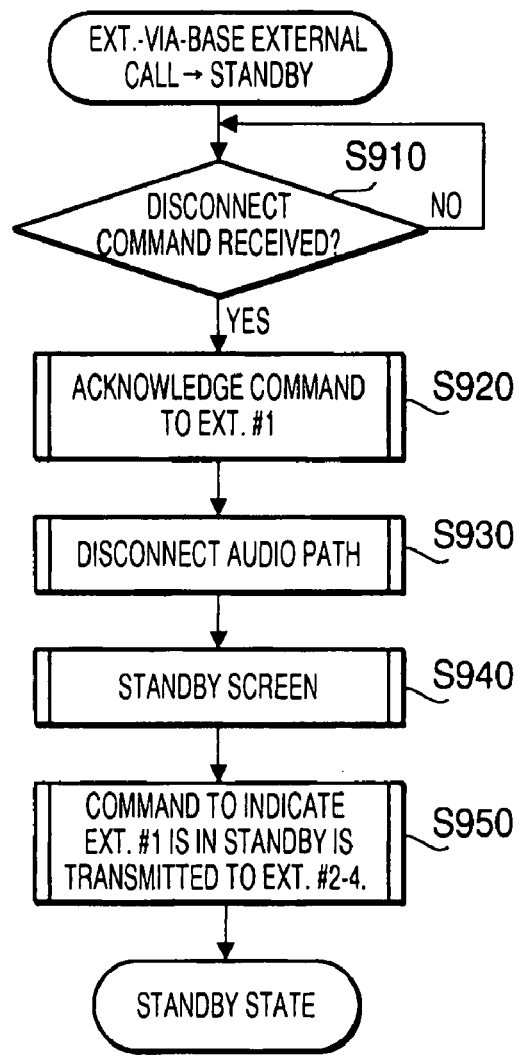
FIG.11A
FIG.11B

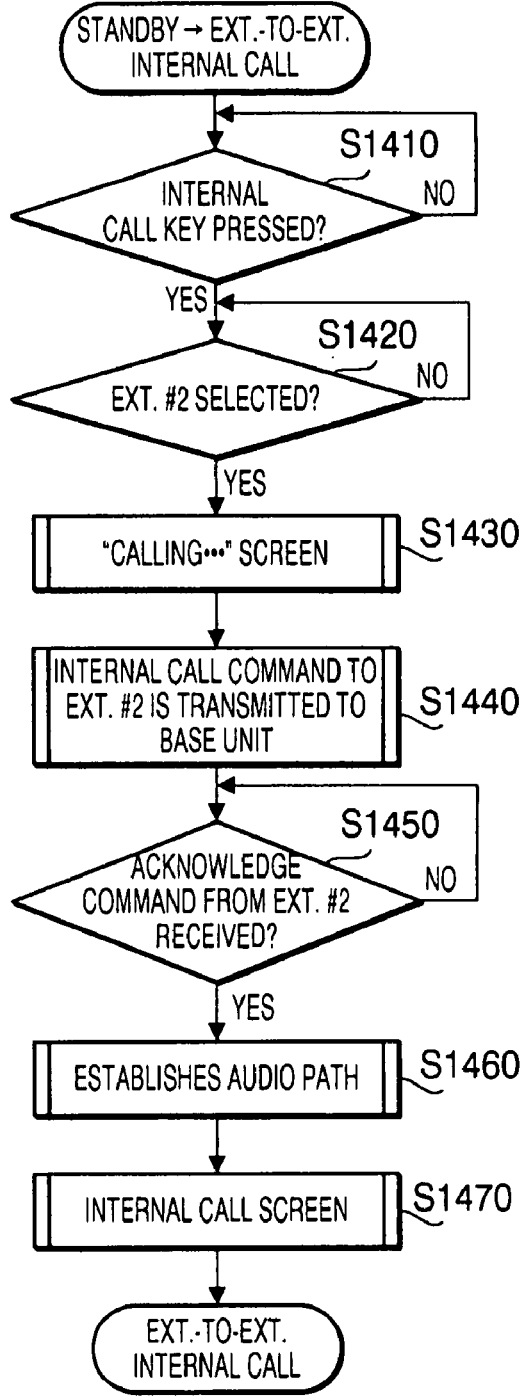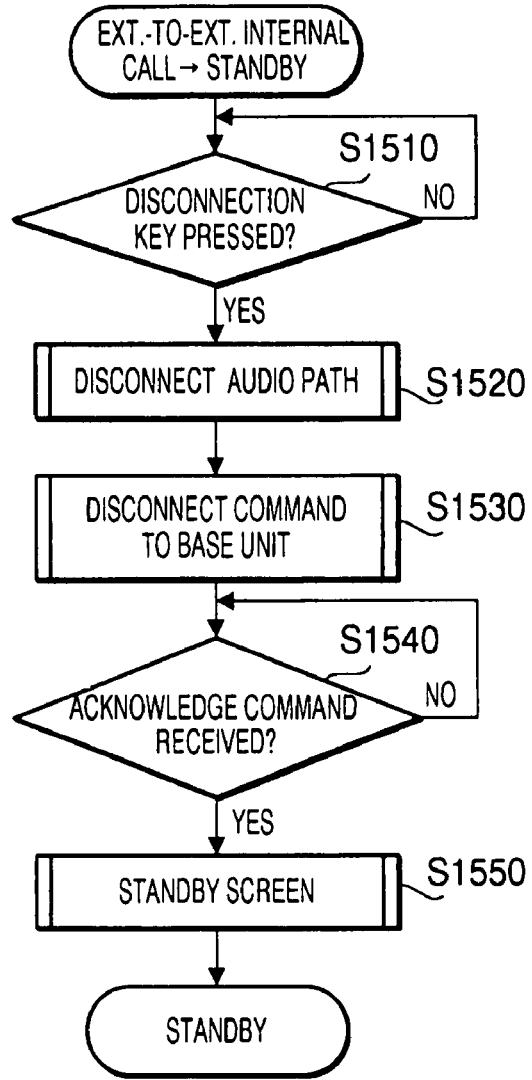
FIG.15A
FIG.15B

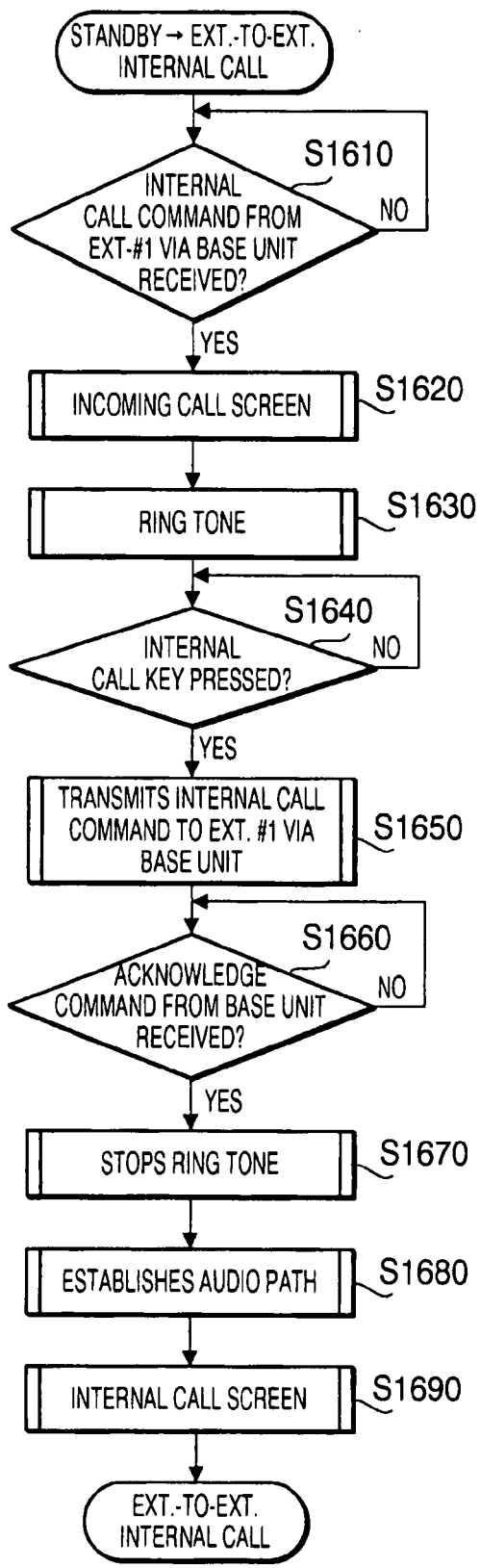
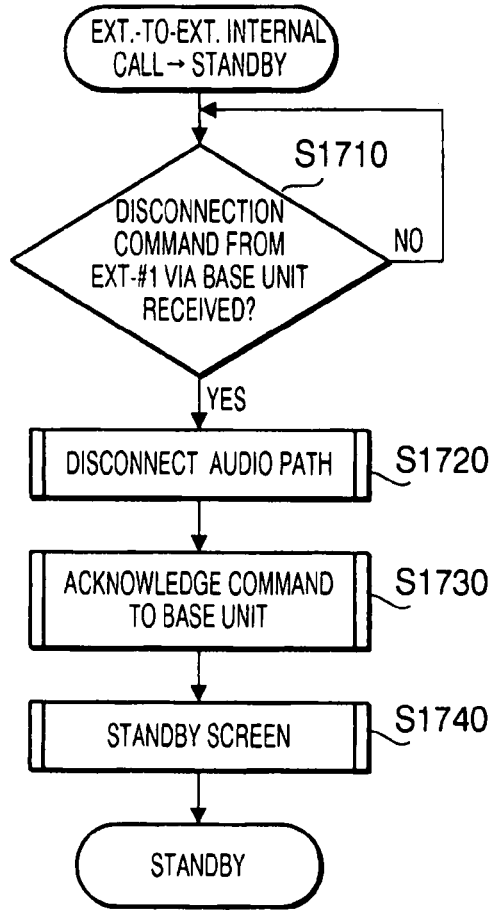
FIG.17A
FIG.17B

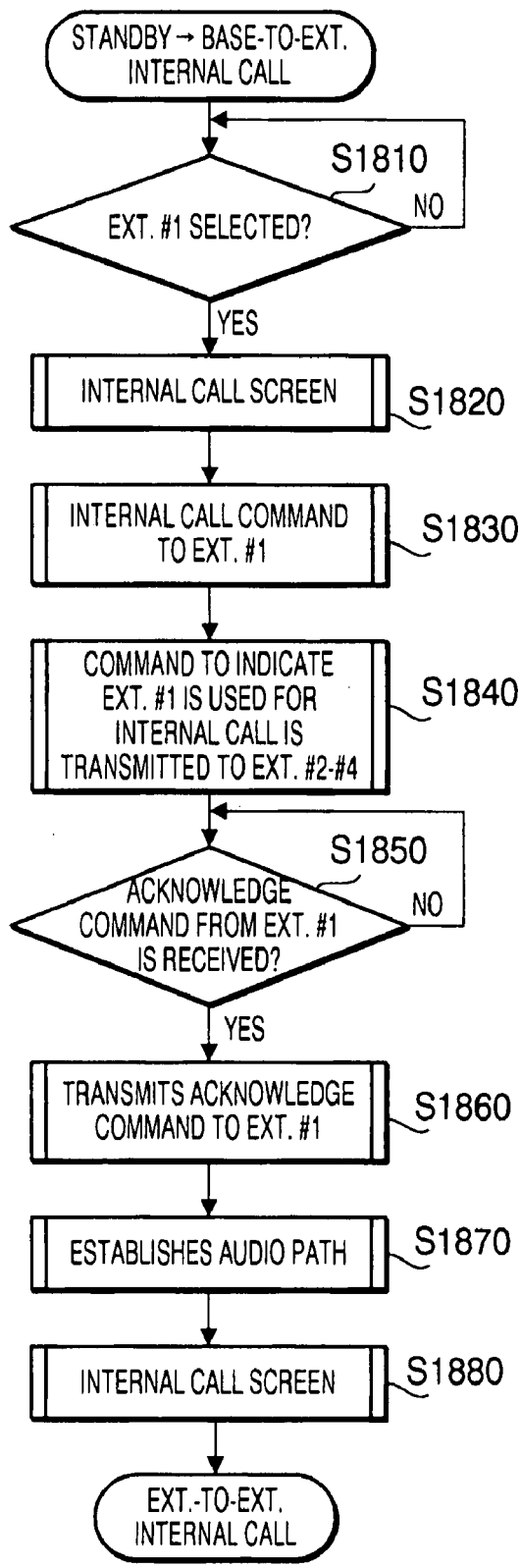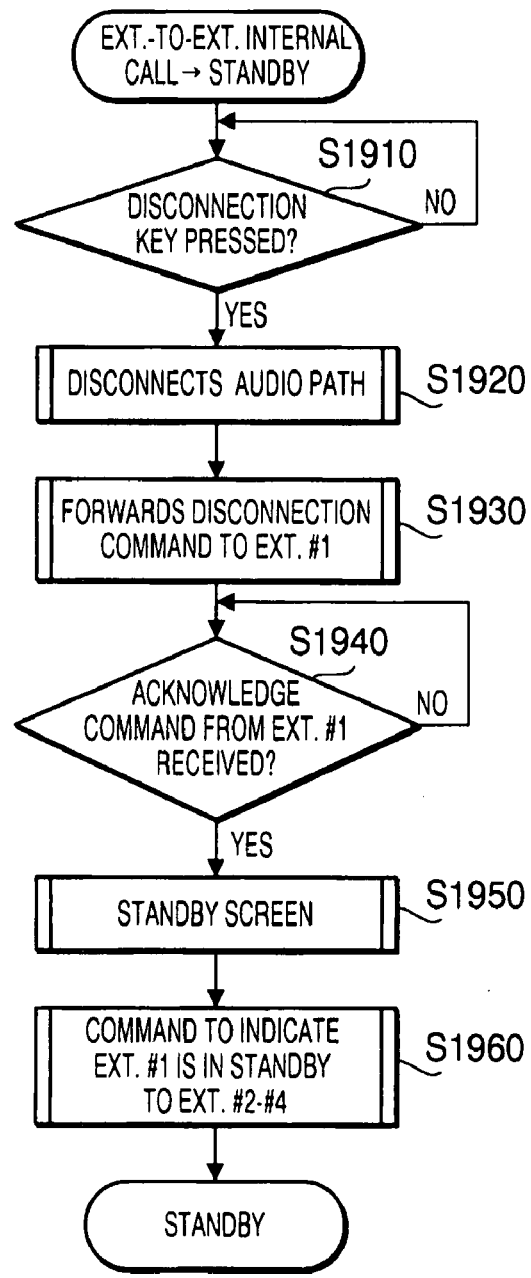
FIG.19A
FIG.19B

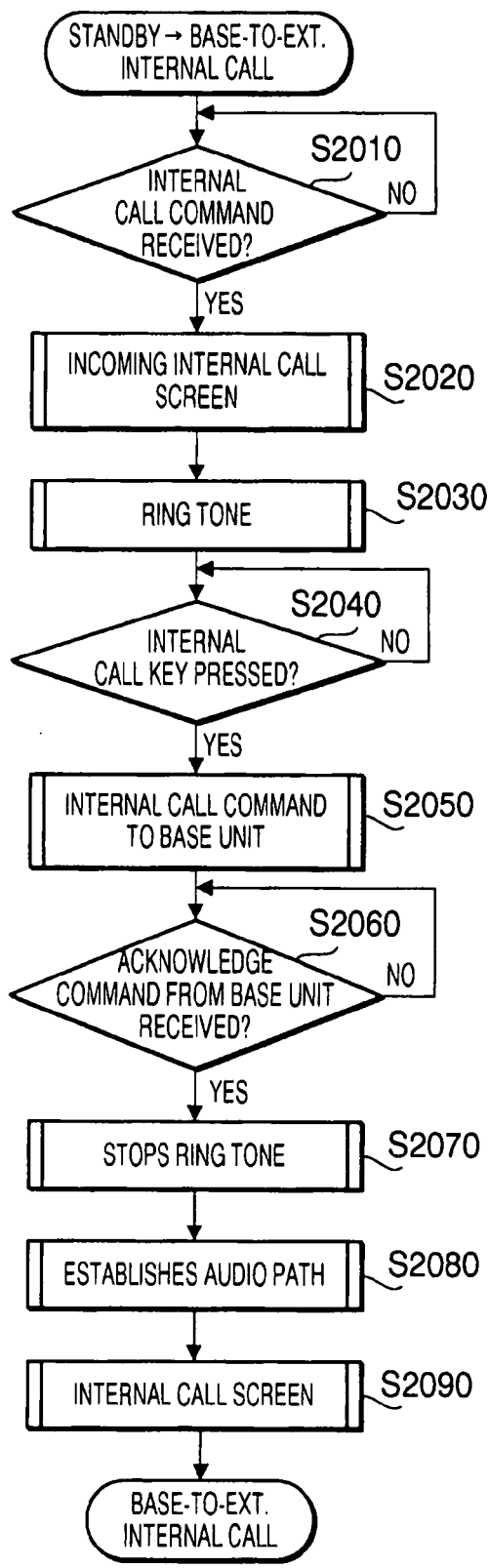
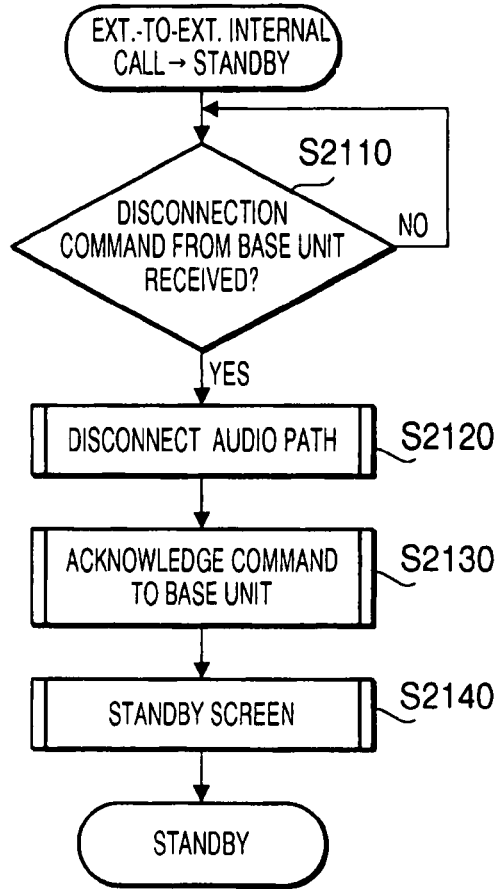
FIG.20A
FIG.20B

COMMUNICATION SYSTEM

CROSS REFERENCE TO RELATED APPLICATION

This application claims priority from Japanese Patent Application NO. 2006-246832, filed on Sep. 12, 2006, the entire subject matter of which is incorporated herein by reference.

BACKGROUND

1. Technical Field

An aspect of the present invention relates to a communication system having a base unit and at least one extension unit.

2. Related Art

Conventionally, a communication system having a base unit and extension units (for example, cordless telephones) has been widely used. The communication system may be configured such that information regarding the base unit and/or one of the extension units in use is indicated in the other extension units which are not in use. An example of such a communication system is disclosed in Japanese Patent Provisional Publication No. H5-336214. In the communication system, when the base unit is in use, for example, a button having a number "0" representing the base unit is illuminated in the extension units. When an internal communication is executed between two extension units (extension-to-extension call), a button having "1" and a button having "3" which respectively represent the two extension units are illuminated.

Thus, a user can recognize communication status (availability) of the base unit and the extension units which are in use based on the indication. When the communication is terminated, the illumination is ceased, and the user is notified of the termination of the communication.

In the communication system of the above configuration, however, information regarding the extension units which are not in use is not indicated, and the user cannot know the communication status of the other extension units.

Therefore, the user is only allowed to know the presence of the base unit and the extension unit currently in use as well as the presence of the extension unit in hand and kept away from seizing presence, communicability, and a number of additional extension units which are not in use.

SUMMARY

In view of the above, the present invention is advantageous in that a communication system, in which a user can recognize presence and communication status of communicable units, is provided.

According to an aspect of the invention, the present invention is advantageous in that a communication system, having a base unit, which is communicably connected to an external communication device, and at least one extension unit, which is communicable with the base unit and with the other extension unit and the external communication device via the base unit, is provided. The base unit includes an information collecting system to collect information of the at least one extension unit in the communication system and an information distributing system to distribute the collected information to each of the at least one extension unit. The at least one extension unit includes an information obtaining system to obtain the distributed information from the information distribution system of the base unit and an indicating system to indicate presence and communication status of each of the at least one extension unit in the communication system based on the obtained information individually on an extension unit basis.

According to another aspect of the invention, the present invention is advantageous in that a communication system, having a plurality of extension units, which are communicable with each other and the external communication device, is provided. At least one of the extension units includes an information collecting system to collect information of the extension units in the communication system, and an information distributing system to distribute the collected information to each of the extension units. Each of the plurality of extension units includes an information obtaining system to obtain the distributed information from the information distribution system, and an indicating system to indicate presence and communication status of each of the extension units in the communication system based on the obtained information individually on an extension unit basis.

According to another aspect of the invention, the present invention is advantageous in that a communication system, having a base unit, which is communicably connected to an external communication device, at least one extension unit, which is communicable with the base unit and with the other extension unit and the external communication device via the base unit, an information collecting system to collect information of the extension units in the communication system, an information obtaining system to obtain the collected information, and an indicating system to indicate presence and communication status of each of the extension units in the communication system based on the obtained information individually on an extension unit basis

BRIEF DESCRIPTION OF THE ACCOMPANYING DRAWINGS

FIGS. 8A and 8B show flowcharts of an extension-to-base internal call process in the base unit according to the embodiment of the present invention.

FIGS. 11A and 11B show flowcharts of an extension-via-base outgoing call process in the base unit according to the embodiment of the present invention.

FIGS. 15A and 15B show flowcharts of the extension-to-extension internal call process in the caller extension unit according to the embodiment of the present invention.

FIGS. 17A and 17B show flowcharts of the extension-to-extension internal call process in the called extension unit according to the embodiment of the present invention.

FIGS. 19A and 19B show flowcharts of a base-to-extension internal call process in the base unit according to the embodiment of the present invention.

FIGS. 20A and 20B show flowcharts of the base-to-extension internal call process in the extension unit according to the embodiment of the present invention.

DETAILED DESCRIPTION

Hereinafter, an embodiment according to aspects of the present invention will be described with reference to the accompanying drawings.

Figure 1:
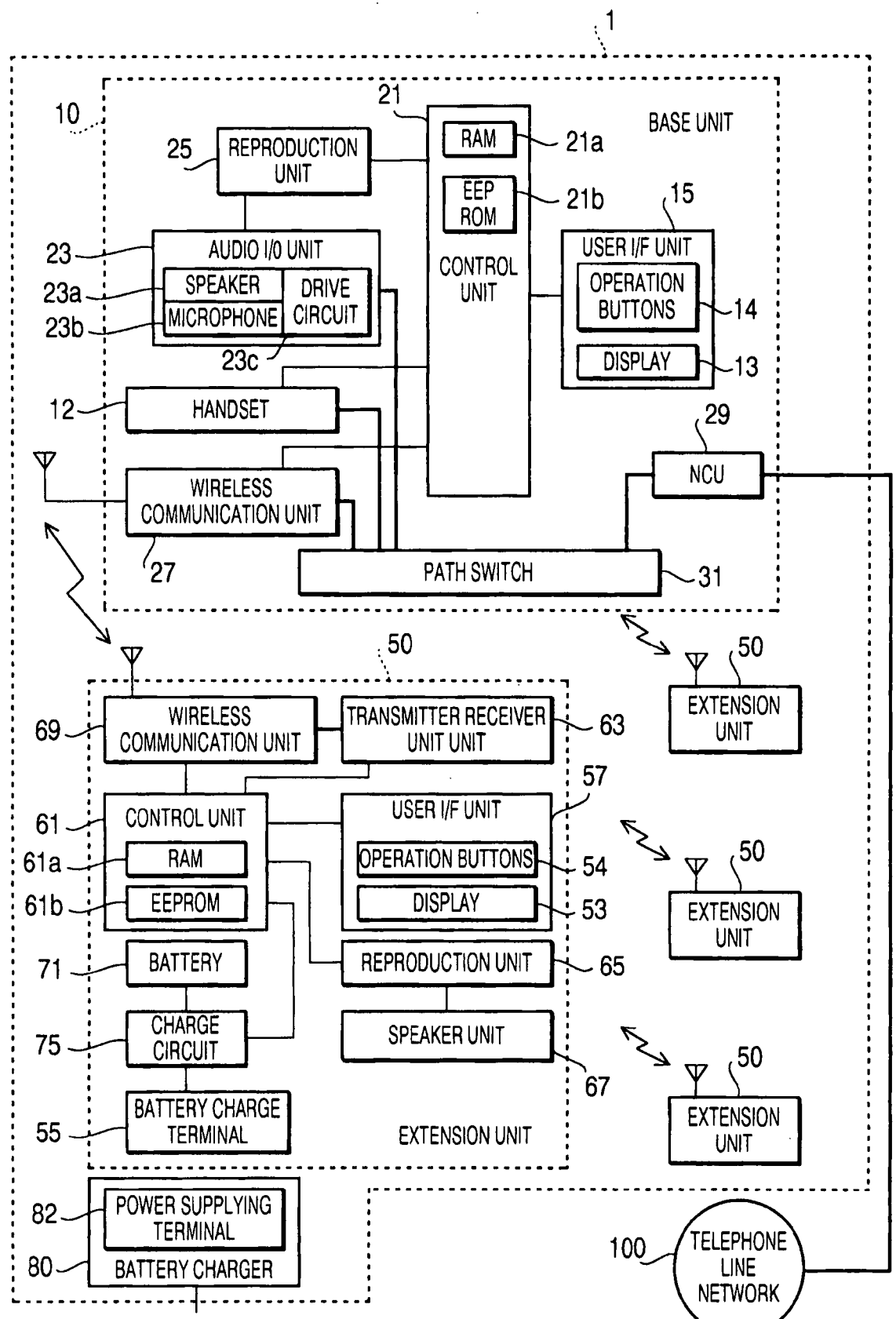
FIG. 1 is a block diagram showing an internal configuration of a communication system according to an embodiment of the present invention.

FIG. 1 is a block diagram showing an internal configuration of a communication system 1 according to the embodiment of the present invention. The communication system 1 includes a base unit 10, four extension units 50, and four battery chargers 80 for the extension units 50.

The base unit 10 is provided with a control unit 21 to control entire operations of the base unit 10, a handset 12, a user I/F (interface) unit 15 having a display 13 and operation buttons 14, an audio I/O (input/output) unit 23 to input and output audio signals, a reproduction unit 25 to reproduce audio based on preliminarily stored audio signals, a wireless communication unit 27 to wirelessly exchange various signals including audio signals between one or more of the extension units 50, an NCU (network control unit) 29 to input and output audio signals transmitted via a telephone line network 100, and a path switch 31 to switch transmission path of the audio signals within the base unit 10.

Further, the control unit 21 is provided with a RAM 21a to store various data and an EEPROM 21b which is capable of storing data without electric supply. The audio I/O unit 23 is provided with a speaker 23a, a microphone 23b, and a drive circuit 23c to drive the speaker 23a and the microphone 23b. With this configuration, the speaker 23a and the microphone 23b can respectively serve as a transmitter and a receiver so that a user can communicate without holding the handset 12 (i.e., so-called handsfree call.)

The reproduction unit 25 stores audio signals representing various sounds such as a ringing tone and a holding tone and reproduces the sounds according to instructions from the control unit 21. The reproduced sounds are output via the speaker 23a.

The path switch 31 switches a path to exchange audio signals between the NCU 29 and one of the handset 12, the audio I/O unit 23, and the wireless communication unit 27. More specifically, the path switch 31 switches the transmission/receive path to establish connection between the handset 12 and the NCU 29 when the handset 12 is removed from the base unit 10. When an operation to start handsfree call is given, the path switch 31 switches the path to establish connection between the audio I/O unit 23 and the NCU 29. When an operation to start a call is given in one of the extension units 50 through an operation button 54 (described later), the path switch 31 switches the path to establish connection between the wireless communication unit 24 and the NCU 29.

Each of the extension units 50 is provided with a control unit 61 a control unit 21 to control entire operations of the extension unit 50, a transmitter/receiver unit 63 having a speaker (not shown), a microphone (not shown), and a drive circuit (not shown) to drive the speaker and the microphone, a user I/F (interface) unit 57 having a display 53 and operation buttons 54, a reproduction unit 65 to reproduce audio based on preliminarily stored audio signals, a speaker unit 67 having a speaker (not shown) to output sound, which is reproduced by the reproduction unit 65, and a drive circuit (not shown) to drive the speaker, a wireless communication unit 29 to wirelessly exchange various signals including audio signals between the wireless communication unit 27 of the base unit 10. Further, the extension unit 50 is provided with a battery 71 to supply power to the extension unit 50 itself, a battery charging terminal 55, which is connected to a power supplying terminal 85 of a battery charger 80 for charging electric power to the battery 71, and a charge circuit 75, which detects voltage applied to the battery charging terminal 55.

The control unit 61 is provided with a RAM 61a to store various data and an EEPROM 61b which is capable of storing data without electric supply. The reproduction unit 65 stores audio signals representing various sounds such as a ringing tone and a holding tone and reproduces the sounds. The reproduced sounds are output via the speaker.

The battery charger 80 having the power supplying terminal 82 is connected to an external power source (not shown) to supply electric power to the battery 71 of the extension unit 50.

In the communication system 1 configured as above, the base unit 10, which is wirelessly communicable with the extension units 50, is communicably connected to an external communication terminal (not shown) via the telephone line network 100. The extension units 50 are thus capable of communicating with the external communication terminal via the base unit 10.

In the present embodiment, the communication system 1 can be expanded to have four extension units 50 at maximum. When a plurality of extension units 50 are provided, communication between two of the extension units can be established via the base unit 10.

In the following description, each of the four extension units 50 may be referred to as extension unit #1, extension unit #2, extension unit #3, and extension unit #4 respectively.

Next, installing processes to be executed in order to install an additional extension unit 50 in the communication system 1 respectively in the base unit 10 and the extension unit 50 will be described. If the communication system 1 of the present embodiment has three extension units #1-#3, one more extension unit 50 (extension unit #4) can be added to be used in the communication system 1.

Figure 2A:
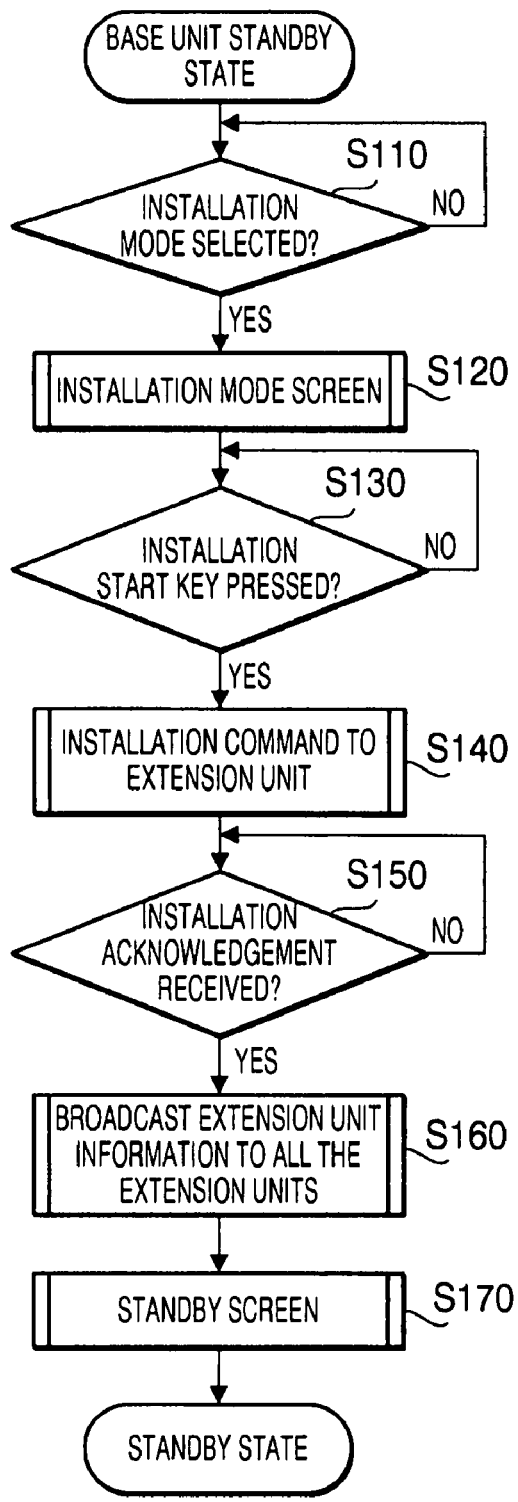
FIGS. 2A and 2B show flowcharts to illustrate installing processes to install an extension unit in the communication system according to the embodiment of the present invention.
Figure 2B:
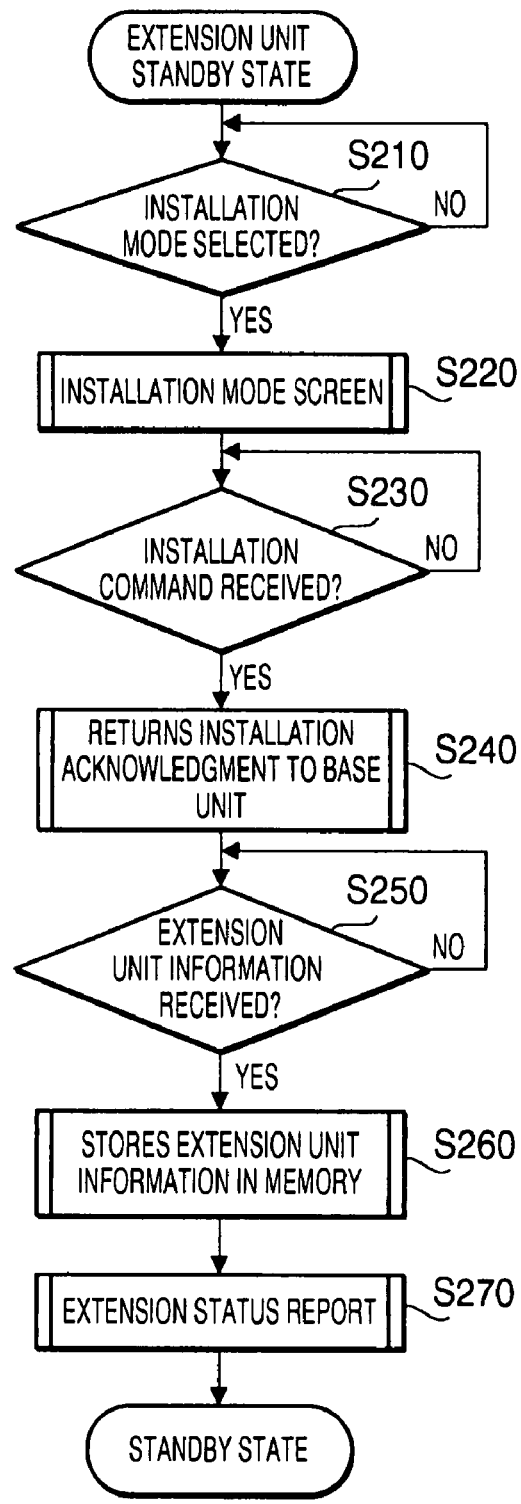

FIGS. 2A and 2B show flowcharts to illustrate the installing processes according to the embodiment of the present invention. FIG. 2A illustrates the installing process to be executed in the base unit 10, and FIG. 2B illustrates the installing process to be executed in the extension unit 50 (extension unit #4) to be added.

Firstly, the installing process in the base unit 10 will be described (see FIG. 2A). Before the process starts, the base unit 10 is in standby state. As the base unit 10 starts the process, in S110, it is judged as to whether an installation mode is selected by a user. If the installation mode is not selected (S110: NO), S110 is repeated.

In S110, if an operation to select the installation mode is given through the operation buttons 14, it is judged that the installation mode is selected (S110: YES.) Next, in S120, a screen for the installation mode is displayed on the display 13. In S130, it is judged as to whether an operation to an "installation start" key is given. If it is judged that the user has not given the operation (S130: NO), S130 is repeated, and the base unit 10 waits until the user gives the operation to the installation start key.

In S130, if it is judged that the operation is given (S130: YES), the base unit 10 transmits an installation command to the extension unit 50 (extension unit #4) to be added (S140.) Next, in S150, it is judged as to whether an installation acknowledgement command is received. If the installation acknowledgement command is not received (S150: NO), S150 is repeated, and the base unit 10 waits until the installation acknowledgement command from the extension unit 50 (extension unit #4) is received.

Figures 3A, 3B, 3C, 4:
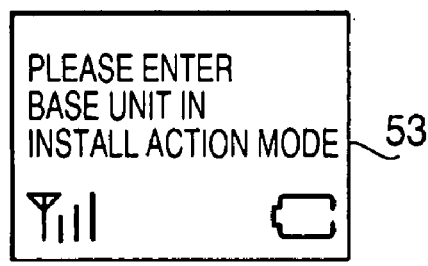
FIGS. 3A-3C show data format in extension unit information according to the embodiment of the present invention.
FIG. 4 shows a diagram to illustrate a screen shown on a display of the extension unit during the installing process according to the embodiment of the present invention.

In S150, if the installation acknowledgement command from the extension unit 50 (extension unit #4) is received (S150: YES), in S160, the base unit 10 transmits extension unit information to all of the extension units 50 (extension units #1-#4) in the communication system 1. FIG. 3A shows data format in the extension unit information transmitted to the extension units 50 (extension units #1-#4) according to the embodiment of the present invention.

More specifically, the extension unit information includes four bytes data representing status of each of the extension units #1-#4 (one byte for one of the extension units #1-#4.) One of values 0, 1, 2, 3, and FF is inputted as the status information, and the values 0, 1, 2, 3, and FF value represent standby (in range), external call, internal call, out of range, and unregistered, respectively.

FIG. 3B shows an example of status information of the extension units 50 (extension units #1-#4) according to the embodiment of the present invention. In this case, it can be found that the extension unit #1 is in a service range of the communication system 1 and in the standby state, the extension unit #2 is occupied for an external call with an external telephone, the extension unit #3 is occupied for an internal call with the base unit 10, and the extension unit #4 is out of the service range.

FIG. 3C shows another example of the status information of the extension units 50 (extension units #1-#4) according to the embodiment of the present invention. In this case, the extension units #1 and #2 are occupied for internal call, and the extension units #3 and #4 are unregistered (i.e., only two extension units 50 are installed in the communication system 1.) The extension unit information is transmitted to the extension units 50 to be used in each extension unit 50.

Following S160, in S170, the base unit 10 displays a standby screen, terminates the installing process, and enters standby state. If an interrupting event such as an incoming call through the telephone line network 100 occurs when the base unit 10 is in standby state in S110, S130, and S150, the base unit 10 can start a process corresponding to the event. However, description for such a process for the interrupting event, which is not directly related to the installing process, is omitted.

Secondly, an installing process (see FIG. 2B) for the extension unit 50 (extension unit #4) being performed in parallel with the installing process for the base unit 10 will be described. As the extension unit 50 starts the installing process, in S210, it is judged as to whether an installation mode is selected by the user. If the installation mode is not selected (S210: NO), S210 is repeated.

In S210, if an operation to select the installation mode is given through the operation buttons 54, it is judged that the installation mode is selected (S210: YES.) Next, in S220, a screen for the installation mode is displayed on the display 53. FIG. 4 shows a diagram to illustrate the screen shown on the display 53 of the extension unit 50 (extension unit #4) during the installing process according to the embodiment of the present invention. The screen shows a message to prompt the user to operate the base unit 10 to place the base unit 10 into the installation mode. When the user presses the installation start key, in S130, an affirmative judgment is made (S130: YES.)

Following S220, in S230, the extension unit 50 judges as to whether the installation command from the base unit 10 is received. If the installation command is not received (S230: NO), S230 is repeated, and the extension unit 50 waits until the installation command is received.

The installation command is transmitted from the base unit 10 in S140 of the installation process of the base unit 10. When the installation command is received, the extension unit 50 makes an affirmative judgment (S230: YES) and returns the installation acknowledgement command to the base unit 10 in S240.

Next, in S250, it is judged as to whether the extension unit information from the base unit 10 is received. If the extension unit information is not received (S250: NO), S250 is repeated, and the extension unit 50 waits until the extension unit information from the base unit 10 is received.

When the extension unit information is received (S250: YES), in S260, the extension unit 50 stores the received extension unit information in the EEPROM 61b. It is noted that the extension unit information unit information received in S250 was transmitted from the base unit in S160 of the installing process of the base unit to all of the extension units 50 (extension units #1-#4.) (See FIGS. 3A-3C.)

Next, in S270, the extension unit 50 (extension unit #4) performs an extension status reporting process, which will be described in detail hereinbelow. Following S270, the installing process in the extension unit 50 is terminated, and the extension unit 50 returns in standby state.

If an interrupting event such as an incoming call through the telephone line network 100 occurs when the extension unit 50 is in standby state in S210, S230, and S250, the extension unit 50 can start a process corresponding to the event. However, description for such a process for the interrupting event, which is not directly related to the installing process, is omitted.

Figure 5:
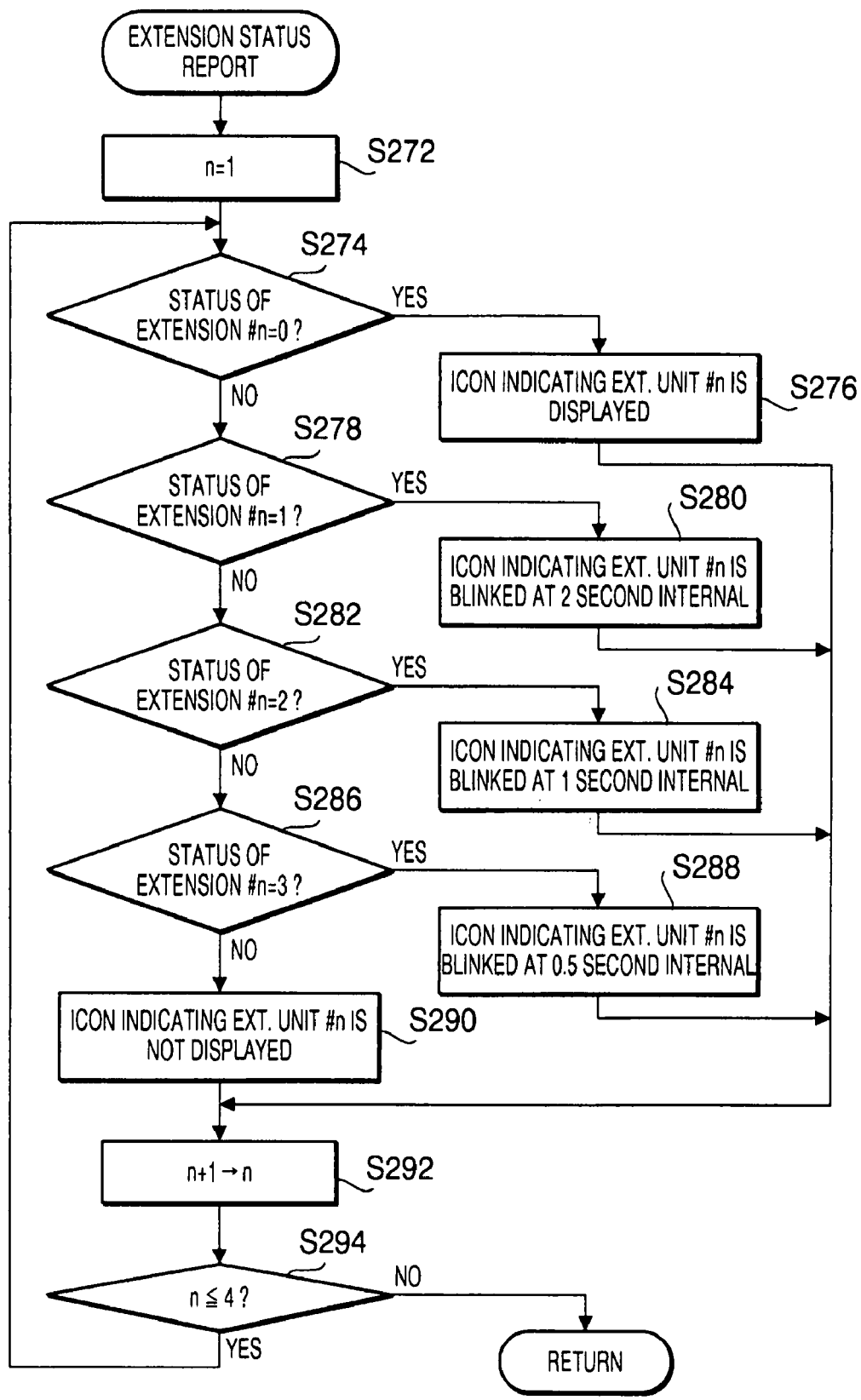
FIG. 5 shows a flowchart to illustrate an extension status reporting process according to the embodiment of the present invention.

Next, the extension status reporting process to be performed in the extension unit 50 (S270 in FIG. 2B) will be described. FIG. 5 shows a flowchart to illustrate the extension status reporting process according to the embodiment of the present invention.

As the extension status reporting process starts, in S272, the extension unit 50 sets an initial value 1 in a loop counter n. In S274, it is judged as to whether status of the extension unit #n, which is indicated in the extension unit information being stored in the EEPROM 61b, is 0. When, for example, n is 1 (i.e., for the first time S274 is performed following S272), it is judged as to whether status of the extension unit #1 indicated in the extension unit information is 0.

If the status of the extension unit #n is 0 (S274: YES), it can be determined that the extension unit #n is in the service range of the communication system 1 and not occupied for an external call or an internal call (i.e., standby state.) Accordingly, in S276, an icon indicating the extension unit #n is displayed (steadily ON) in the display 53.

Figure 6:
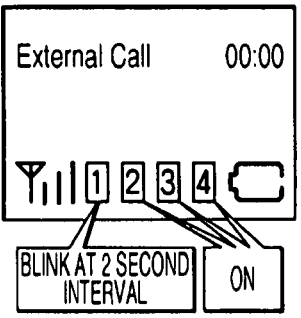
FIG. 6 shows illustrative display of screens of the extension units according to the embodiment of the present invention.

FIG. 6 shows illustrative display of the screens of the extension units 50 according to the embodiment of the present invention. In the present embodiment, the icon representing the extension unit 50 is designed to have a boxed figure which corresponds to the number assigned to the extension unit 50. For example, for the extension unit #1, a figure "1" in a box is displayed steadily in the display 53. For the extension units #2, #3, and #4, boxed figures "2", "3", and "4" are displayed steadily in the display 53.

Meanwhile, in S274, if the status of the extension unit #n is not 0 (S274: NO), in S278, it is judged as to whether the status of the extension unit #1 is 1. If n is 1, it is judged as to whether the status of the extension unit #1 included in the extension unit information is 1.

If the status of the extension unit #n is 1 (S278: YES), it can be determined that the extension unit #n is in the service range of the communication system 1 and occupied for an external call. Accordingly, in S280, the icon indicating the extension unit #n is displayed and blinked at an interval of 2 seconds in the display 53.

Meanwhile, in S278, if the status of the extension unit #n is not 1 (S278: NO), in S282, it is judged as to whether the status of the extension unit #1 is 2. If n is 1, it is judged as to whether the status of the extension unit #1 included in the extension unit information is 2.

If the status of the extension unit #n is 2 (S282: YES), it can be determined that the extension unit #n is in the service range of the communication system 1 and occupied for an internal call. Accordingly, in S284, the icon indicating the extension unit #n is displayed and blinked at an interval of 1 second in the display 53.

Meanwhile, in S282, if the status of the extension unit #n is not 2 (S282: NO), in S286, it is judged as to whether the status of the extension unit #1 is 3. If n is 1, it is judged as to whether the status of the extension unit #1 included in the extension unit information is 3.

If the status of the extension unit #n is 3 (S286: YES), it can be determined that the extension unit #n is out of the service range of the communication system 1. Accordingly, in S288, the icon indicating the extension unit #n is displayed and blinked at an interval of 0.5 second in the display 53.

in S286, if the status of the extension unit #n is not 3 (S286: NO), in S290, it can be determined that the status of the extension unit #n is FF, which indicates the extension unit #n is unregistered. Accordingly, in S290, the icon indicating the extension unit #n is not displayed (steadily OFF.)

Following the steps S274 through S290, in S292, the extension unit 50 increments the loop counter n by 1, and in S294, it is judged as to whether n is smaller than or equal to 4. If n is smaller than or equal to 4 (S294: YES), it is determined that at least one extension unit 50 remains unprocessed. Accordingly, the process following S274 is repeated.

As the process is repeated, the value in the loop counter n is incremented one by one up to 4, and the four icons, each of which respectively indicates the extension units #1-#4, are displayed (or not displayed) in the display 53. The icons are one of steadily displayed, blinded at 2 second interval, blinked at 1 second interval, blinked at 0.5 second interval, and not displayed.

When the process is repeated four times, in S292, the value in the loop counter n reaches to 5, which is judged to be negative in S294 (S294: NO), and the extension status reporting process is terminated.

FIG. 6 shows illustrative display of screens of the extension units 50 (extension units #1-#4) during the extension status reporting process according to the embodiment of the present invention. In FIG. 6, the displays 53 of the extension units #1-#4 in three cases are shown.

In a first case, four extension units #1-#4 are provided. The extension unit #1 is used for an external call with an external telephone, and the remaining external units #2-#4 are in standby state. As the status information of the extension unit #1 being occupied is broadcasted to the extension units #1-#4 via the base unit 10, the icon indicating the extension unit #1 is blinked at 2 second interval in each extension unit #1-#4. Simultaneously, the status information of the remaining extension units #2-#4 is transmitted to the extension units #1-#4 via the base unit 1, and the icons indicating the extension units #2-#4 are displayed (steadily ON) in each extension unit #1-#4.

In a second case, four extension units #1-#4 are provided. The extension unit 1 is used for an internal call with the base unit 10, and the remaining external units #2-#4 are in standby state. As the status information of the extension unit #1 being occupied is broadcasted to the extension units #1-#4 via the base unit 10, the icon indicating the extension unit #1 is blinked at 1 second interval in each extension unit #1-#4. Simultaneously, the status information of the remaining extension units #2-#4 is transmitted (broadcasted) to the extension units #1-#4 via the base unit 1, and the icons indicating the extension units #2-#4 are displayed (steadily ON) in each extension unit #1-#4.

In a third case, four extension units #1-#4 are provided. The extension unit #1 is either out of the service range of the communication system 1 or switched OFF. The remaining extension units #2-#4 are standby in the service range. The status information of the extension unit #1 being out of the range is transmitted to each extension unit #1-#4.

However, as the extension unit #1 is out of the service range of the communication system 1, the extension unit #1 cannot receive the status information transmitted from the base unit 1, and the status information is received only by the extension units #2-#4. Accordingly, the icon indicating the extension unit #1 is blinked at 0.5 second interval. Simultaneously, the status information of the remaining extension units #2-#4 is transmitted to the extension unit #1 (but not received) and the extension units #2-#4 via the base unit 1, and the icons indicating the extension units #2-#4 are displayed (steadily ON) in the extension unit #2-#4.

Meanwhile, the status of the extension unit #1 being outside the range, which cannot receive the information from the base unit 10, can be recognized by the extension unit #1 itself. Therefore, the icon indicating the extension unit #1 is blinked at 0.5 second interval and the icons indicating the extension units #2-#4 are not displayed (steadily OFF) in the extension unit #1.

Figure 7:
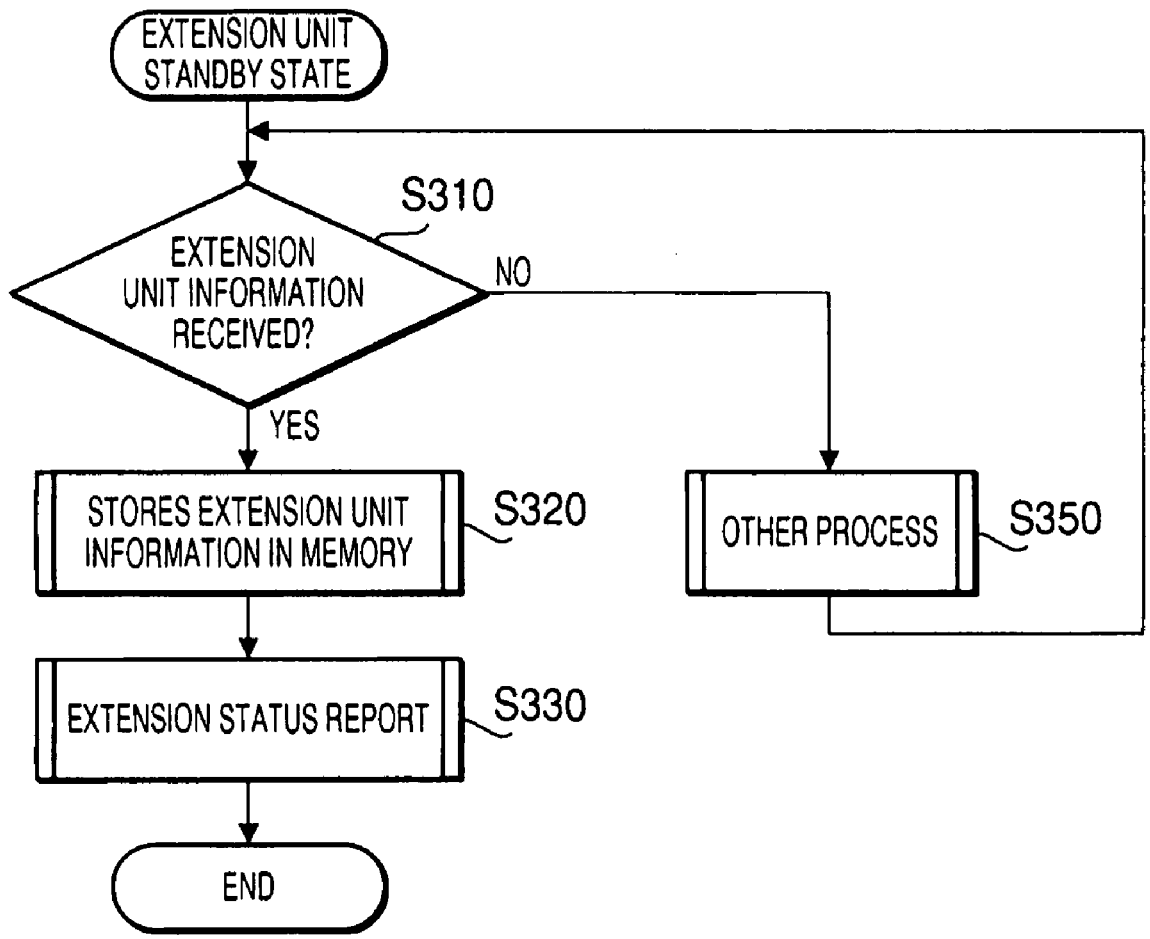
FIG. 7 shows a flowchart to illustrate an extension status updating process according to the embodiment of the present invention.

Next, an extension status updating process performed in the extension units 50 (extension units #1-#4) will be described. The extension status updating process is performed when the status of the extension units 50 to be displayed in the displays 53 is updated. Moreover, the extension status updating process is also performed when the extension unit information from the base unit 10 is received by the extension units 50. FIG. 7 shows a flowchart to illustrate the extension status updating process according to the embodiment of the present invention.

As the extension status updating process starts, the extension units 50, being in standby state, judges as to whether status information (see FIGS. 3A-3C) of the extension units 50 from the base unit 10 is received in S310. If the extension unit information is received (S310: YES), in S320, the extension units 50 stores the extension unit information in the EEPROM 61b. The stored extension unit information will be transmitted to all the extension units 50 (extension units #1-#4) by the base unit 10 in a following process.

Following S320, in S330, the extension units 50 perform the extension status reporting process (see FIG. 5), and terminate the extension status updating process. The extension units 50 thereafter return in standby state.

Meanwhile, in S310, if it is judged that the extension unit information is not received (S310: NO), in S350, the extension units 50 perform a process corresponding to the event in S310 and returns to S310. Thus, the extension units 50 waits until the extension unit information is transmitted. Description for the process in S350, which is not directly related to the extension status updating process, is omitted.

Figure 9A:
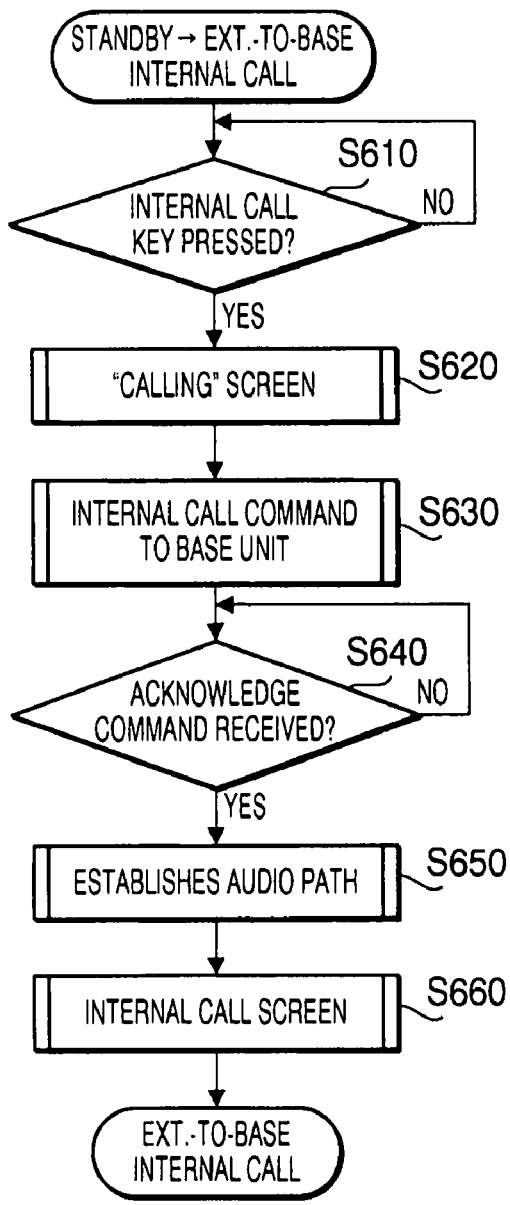
FIGS. 9A and 9B show flowcharts of the extension-to-base internal call process in the extension unit according to the embodiment of the present invention.
Figure 9B:
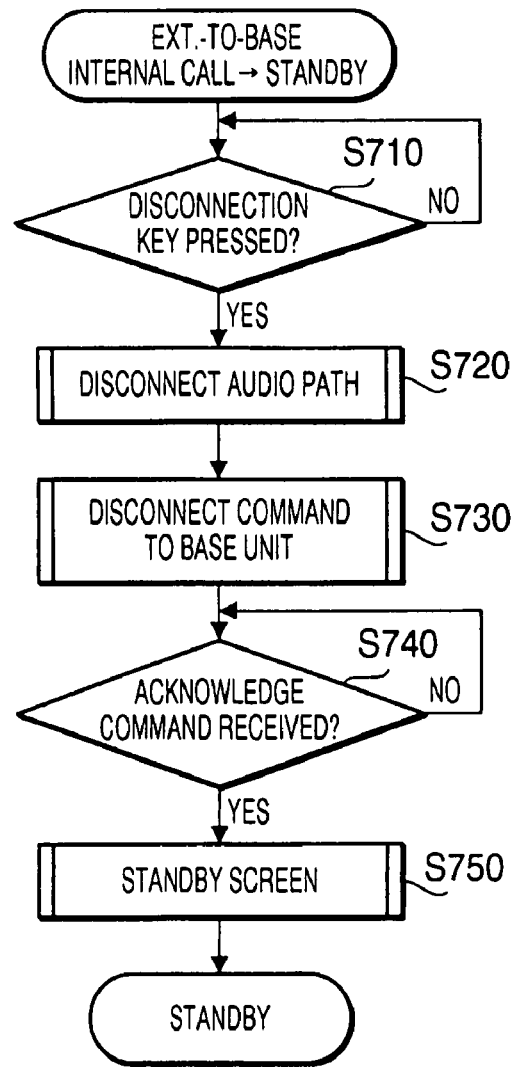

Next, an extension-to-base internal call process, which is performed in the base unit 10 and one of the extension units 50 respectively, will be described. FIGS. 8A and 8B show flowcharts of the extension-to-base internal call process in the base unit 10 according to the embodiment of the present invention. FIGS. 9A and 9B show flowcharts of the extension-to-base internal call process in the extension units 50 according to the embodiment of the present invention.

Firstly, the extension-to-base internal call process in the base unit 10 will be described (see FIG. 8A.) In the following description, the extension unit #1 is referred to as an example of any one of the extension units #1-#4 (extension units 50), but the operations can be similarly performed in any one of the extension units #2-#4.

As the process starts, in S410, the base unit 10 in standby state judges as to whether an internal call command from the extension unit #1 is received. If the internal call command is not received (S410: NO), the base unit 10 repeats S410 and maintains the standby state.

If the internal call command is received (S410: YES), in S420, the base unit 10 displays a screen to indicate the incoming internal call on the display 13, and in S430, it is judged as to whether the user answers the call. More specifically, affirmative judgment is made when the handset 12 is picked up by the user or an operation to start handsfree call through the operation buttons 14 is made. If neither of the operations are performed, negative judgment is made. If the negative judgment is made (S430: NO), the base unit 10 repeats S430 and waits until the user answers the call.

In S430, if the affirmative judgment is made (S430: YES), in S440, the base unit 10 transmits an acknowledgment command to the extension unit #1 which has transmitted the internal call command. Further, in S450, a command indicating that the extension unit #1 is occupied for the internal call is transmitted to the remaining extension units #2-#4. In S440 and S450 respectively, the base unit 10 transmits the identical extension unit information (see FIGS. 3A-3C) indicating the status of the extension units #1-#4 to the extension unit #1 in S440 and to the remaining extension units #2-#4 in S450.

Next, in S460, the base unit 10 establishes an audio path with the extension unit #1, and in S470, a screen for internal call is displayed on the display 13. Thus, the internal call between the base unit 10 and the extension unit #1 is achieved.

During the internal call, in S510 (see FIG. 8B), it is judged as to whether the base unit 10 receives a disconnection command transmitted from the extension unit #1. If no disconnection command is received (S510: NO), the base unit 10 repeats S510 and maintains the internal call.

In S510, if the disconnection command from the extension unit #1 is received (S510: YES), in S520, the base unit 10 transmits an acknowledge command to the extension unit #1, which has transmitted the disconnection command. Next, in S530, the base unit 10 disconnects the audio path with the extension unit #1. In S540, communication of the base unit 10 enters standby state and displays a screen indicating the standby state.

Next, in S550, the base unit 10 transmits a command indicating that the extension #1 is in standby state to the extension units #2-#4. It is noted that, in S520 and S550, the base unit 10 transmits the identical extension unit information (see FIGS. 3A-3C) to the extension unit #1 in S520 and to the remaining extension units #2-#4 S550 respectively. Thus, the base unit 10 enters standby state.

Secondly, the extension-to-base internal call process (see FIG. 9A) for the extension unit 50 (extension unit #1) being performed in parallel with the extension-to-base internal call process for the base unit 10 will be described.

As the process starts, in S610, the extension unit #1 judges as to whether the user operates (presses) a key for internal call. If the user has not presses the key (S610: NO), the extension unit #1 repeats S610 and maintains the standby state.

Figure 10A:
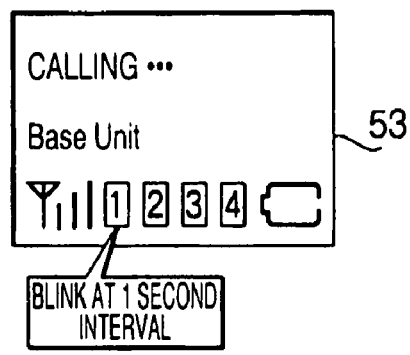
FIGS. 10A-10C show diagrams to illustrate screens shown on the display of the extension unit during the extension-to-base internal call process according to the embodiment of the present invention.

In S610, if the user presses the key for internal call (S610: YES), in S620, the extension unit #1 displays a screen for internal call on the display 53. FIG. 10A shows a diagram to illustrate the screen to be shown on the display 53 of the extension unit #1 during S620 in the extension-to-base internal call process according to the embodiment of the present invention. In the screen on the display 13, the icon indicating the extension unit #1 is blinked at 1 second interval so that the user can recognize the extension unit #1 is used in the internal call by the blinks and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S620.

Following S620, in S630, the extension unit #1 transmits an internal call command to the base unit 10. The base unit 10 receiving the internal call command will make the affirmative judgment in S410 as described above.

Thereafter, in S640, it is judged as to whether the acknowledge command from the base unit 10 is received. If no acknowledge command is received (S640: NO), the extension unit #1 repeats S640.

Figure 10B:
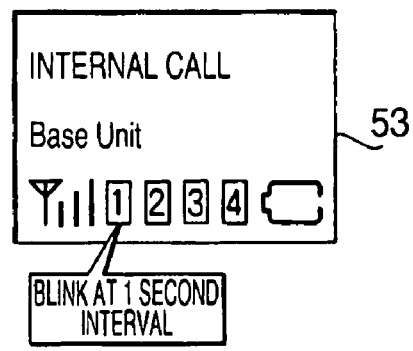

The acknowledge command to be received in S640 is transmitted from the base unit 10 in S440 (see FIG. 8A.) When the acknowledge command is received by the extension unit #1 (S640: YES), in S650, the extension unit #1 establishes the audio path with the base unit 10. Thereafter, in S660, a screen for the internal call is displayed on the display 53. Thus, the internal call between the extension unit #1 and the base unit 10 is achieved. FIG. 10B shows a diagram to illustrate the screen to be shown on the display 53 of the extension unit #1 during S660 in the extension-to-base internal call process according to the embodiment of the present invention. In the screen on the display 53, the icon indicating the extension unit #1 is blinked at 1 second interval so that the user can recognize the extension unit #1 is used in the internal call by the blinks and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S660.

During the internal call, in S710 (see FIG. 10B), it is judged as to whether the user has pressed a key for disconnecting the communication. If the user has not pressed the key (S710: NO), the extension unit #1 repeats S710 and maintains the internal call.

In S710, if the user has pressed the key to disconnect (S710: YES), in S720, the extension unit #1 disconnects the audio path with the base unit 10 and, in S730, transmits a disconnection command to the base unit 10. The disconnection command transmitted in S730 will be received in the base unit 10 in S510 (see FIG. 8B) to make the affirmative judgment.

Following S730, in S740, it is judged as to whether the acknowledge command transmitted from the base unit 10 is received. When no acknowledge command is received (S740: NO), the extension unit #1 repeats S740 and waits for the acknowledge command.

Figure 10C:
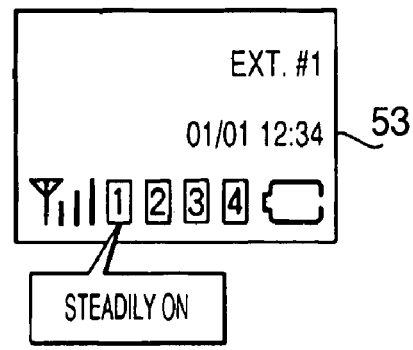

The acknowledge command to be received in S740 is transmitted from the base unit 10 in S520 (see FIG. 8B.) When the acknowledge command is received (S740: YES), in S750, the extension unit #1 displays a standby screen on the display 53 and enters standby state. FIG. 10C shows a diagram to illustrate the screen to be shown on the display 53 of the extension unit #1 during S750 in the extension-to-base internal call process according to the embodiment of the present invention. In the screen on the display 53, the icon indicating the extension unit #1, which has been blinked at 1 second interval, is switched to be steadily ON so that the user can recognize the internal call of the extension unit #1 is terminated and the extension unit #1 is now in standby state by the display (steadily ON) and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S750.

Figure 12A:
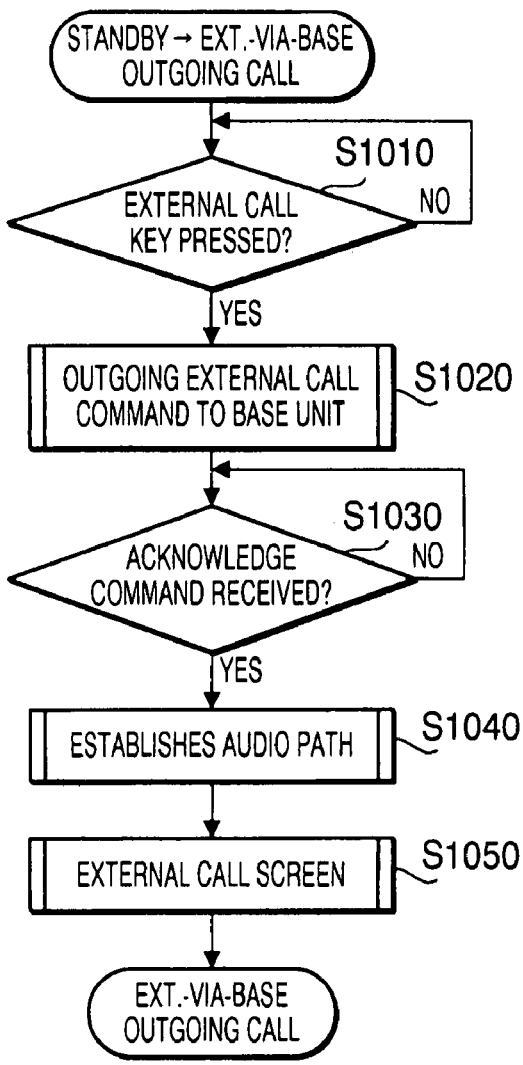
FIGS. 12A and 12B show flowcharts of the extension-via-base outgoing call process in the extension unit according to the embodiment of the present invention.
Figure 12B:
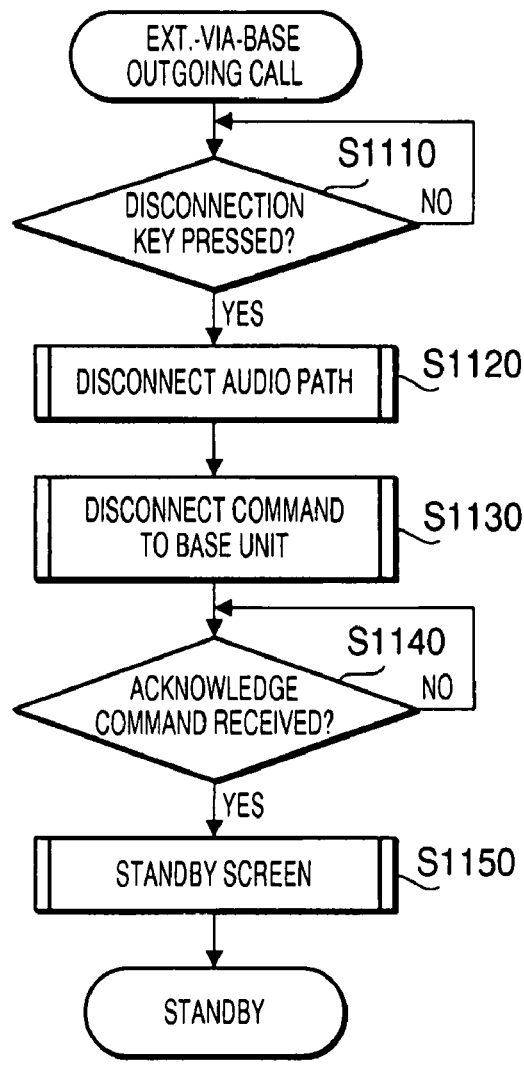

Next, extension-via-base outgoing call processes performed in the base unit 10 and the extension unit 50 respectively will be described. FIGS. 11A and 11B show flowcharts of the extension-via-base outgoing call process in the base unit 10 according to the embodiment of the present invention. FIGS. 12A and 12B show flowcharts of the extension-via-base outgoing call process in the extension unit 50 according to the embodiment of the present invention.

Firstly, the extension-via-base outgoing process in the base unit 10 will be described (see FIG. 11A.) In the following description, the extension unit #1 is referred to as an example of any one of the extension units #1-#4 (extension units 50), but the operations can be similarly performed in any one of the extension units #2-#4.

As the process starts, in S810, the base unit 10 in standby state judges as to whether an outgoing call command from the extension unit #1 is received. If the outgoing call command is not received (S810: NO), the base unit 10 repeats S810 and maintains the standby state.

If the outgoing call command is received (S810: YES), in S820, the base unit 10 displays a screen to indicate the outgoing external call on the display 13, and in S830, the base unit 10 transmits an acknowledgment command to the extension unit #1 which has transmitted the outgoing external call command. Further, in S840, a command indicating that the extension unit #1 is occupied for the external call is transmitted to the remaining extension units #2-#4. It is noted that, in S830 and S840, the base unit 10 transmits the identical extension unit information (see FIGS. 3A-3C) to the extension unit #1 in S830 and to the remaining extension units #2-#4 in S840 respectively.

Next, in S850, the base unit 10 establishes an audio path with the extension unit #1, and in S860, a screen for external call is displayed on the display 13. Thus, the external call from the extension unit #1 via the base unit 10 is achieved.

During the external call, in S910 (see FIG. 11B), it is judged as to whether the base unit 10 receives a disconnection command transmitted from the extension unit #1. If no disconnection command is received (S910: NO), the base unit 10 repeats S910 and maintains the external call.

In S910, if the disconnection command from the extension unit #1 is received (S910: YES), in S920, the base unit 10 transmits an acknowledge command to the extension unit #1, which has transmitted the disconnection command. Next, in S930, the base unit 10 disconnects the audio path with the extension unit #1. In S940, communication of the base unit 10 enters standby state and displays a screen indicating the standby state.

Next, in S950, the base unit 10 transmits a command indicating that the extension #1 is in standby state to the extension units #2-#4. It is noted that, in S920 and S950, the base unit 10 transmits the identical extension unit information (see FIGS. 3A-3C) to the extension unit #1 in S920 and to the remaining extension units #2-#4 in S950 respectively. Thus, the base unit 10 enters standby state.

Secondly, an extension-via-base outgoing call process (see FIG. 12A) for the extension unit 50 (extension unit #1) being performed in parallel with the extension-via-base outgoing call process for the base unit 10 will be described.

As the process starts, in S1010, the extension unit #1 judges as to whether the user operates (presses) a key for external call. If the user has not presses the key (S1010: NO), the extension unit #1 returns to S1010 and maintains the standby state.

In S1010, if the user presses the key for external call (S1010: YES), in S1020, the extension unit #1 transmits an outgoing external call command to the base unit 10. The base unit 10 receiving the outgoing external call command will make the affirmative judgment in S810 as described above.

Thereafter, in S1030, it is judged as to whether the acknowledge command from the base unit 10 is received. If no acknowledge command is received (S1030: NO), the extension unit #1 repeats S1030.

Figure 13A:
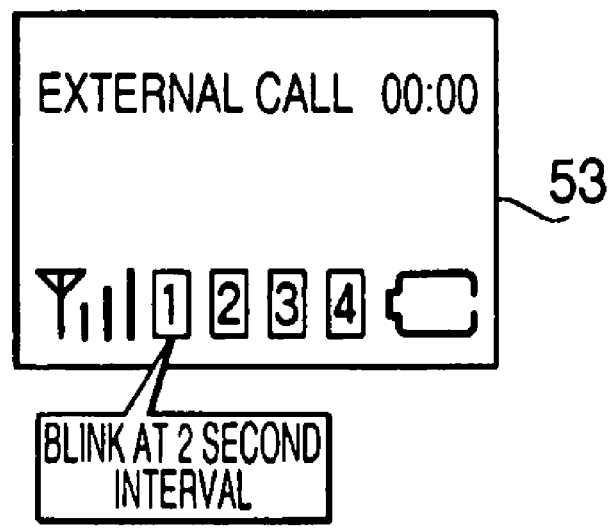
FIGS. 13A and 13B show diagrams to illustrate screens shown on the display of the extension unit during the extension-via-base outgoing call process according to the embodiment of the present invention.

The acknowledge command to be received in S1030 is transmitted from the base unit 10 in S830 (see FIG. 11A.) When the acknowledge command is received by the extension unit #1 (S1030: YES), in S1040, the extension unit #1 establishes the audio path with the base unit 10. Thereafter, in S1050, a screen for the external call is displayed on the display 53. Thus, the outgoing external call from the extension unit #1 via the base unit 10 is achieved. FIG. 13A shows a diagram to illustrate the screen to be shown on the display 53 of the extension unit #1 during S1050 in the extension-via-base outgoing call process according to the embodiment of the present invention. In the screen on the display 53, the icon indicating the extension unit #1 is blinked at 2 second interval so that the user can recognize the extension unit #1 is used in the external call by the blinks and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S1050.

During the external call, in S1110 (see FIG. 12B), it is judged as to whether the user has pressed a key for disconnecting the communication. If the user has not pressed the key (S1110: NO), the extension unit #1 repeats S1110 and maintains the external call.

In S1110, if the user has pressed the key to disconnect (S1110: YES), in S1120, the extension unit #1 disconnects the audio path with the base unit 10 and, in S1130, transmits a disconnection command to the base unit 10. The disconnection command transmitted in S1130 will be received in the base unit 10 in S910 (see FIG. 11B) to make the affirmative judgment.

Following S1130, in S1140, it is judged as to whether the acknowledge command transmitted from the base unit 10 is received. When no acknowledge command is received (S1140: NO), the extension unit #1 repeats S1140 and waits for the acknowledge command.

Figure 13B:
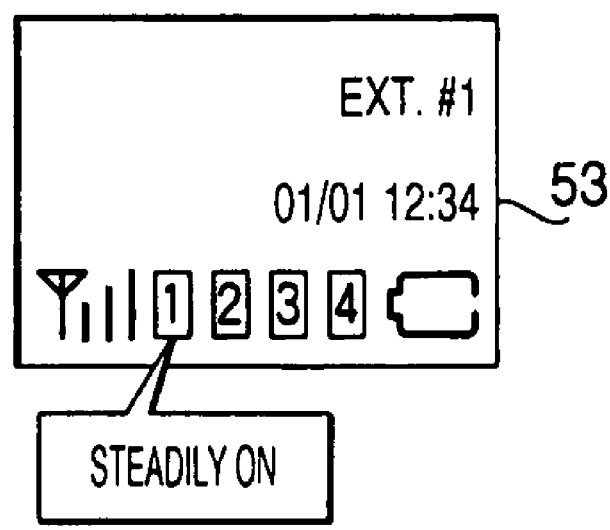

The acknowledge command received in S1140 is transmitted from the base unit 10 in S920 (see FIG. 11B.) When the acknowledge command is received (S1140: YES), in S1150, the extension unit #1 displays a standby screen on the display 53 and enters standby state. FIG. 13B shows a diagram to illustrate the screen to be shown on the display 53 of the extension unit #1 during S1150 in the extension-via-base outgoing call process according to the embodiment of the present invention. In the screen on the display 53, the icon indicating the extension unit #1, which has been blinked at 2 second interval, is switched to be steadily ON so that the user can recognize the external call of the extension unit #1 is terminated and the extension unit #1 is now in standby state by the display (steadily ON) and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S1150.

Figures 14A, 14B:
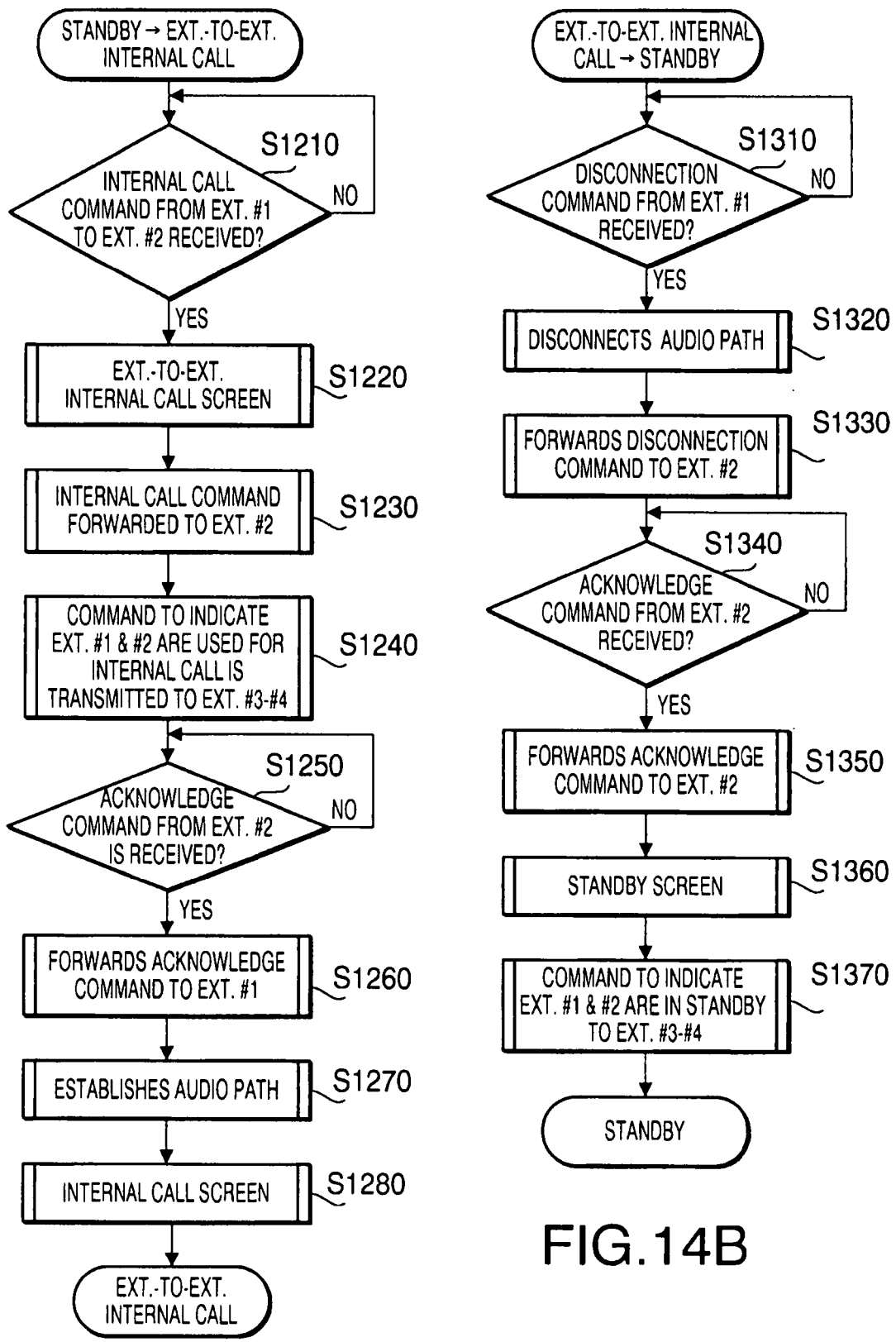
FIGS. 14A and 14B show flowcharts of an extension-to-extension internal call process in the base unit according to the embodiment of the present invention.

Next, an extension-to-extension internal call process, which is performed in the base unit 10 and two extension units 50 (extension units #1, #2) respectively, will be described. FIGS. 14A and 14B show flowcharts of the extension-to-extension internal call process in the base unit 10 according to the embodiment of the present invention. FIGS. 15A and 15B show flowcharts of the extension-to-extension internal call process in the extension unit 50 as a caller (extension unit #1) according to the embodiment of the present invention. FIGS. 17A and 17B show flowcharts of the extension-to-extension internal call process in the called extension unit 50 (extension unit #2) according to the embodiment of the present invention.

Firstly, the extension-to-extension internal call process in the base unit 10 will be described (see FIG. 14A.) In the following description, the extension unit #1 as a caller extension unit and the extension unit #2 as a called extension unit are referred to as examples of any ones of the extension units #1-#4 (extension units 50), but the operations can be similarly performed in any ones of the extension units #2-#4.

As the process starts, in S1210, the base unit 10 in standby state judges as to whether an internal call command from the extension unit #1 to the extension unit #2 is received. If the internal call command is not received (S1210: NO), the base unit 10 repeats S1210 and maintains the standby state.

If the internal call command is received (S1210: YES), in S1220, the base unit 10 displays a screen to indicate the extension-to-extension internal call on the display 13, and in S1230, the internal call command from the extension unit #1 is forwarded to the extension unit #2. In addition, the extension unit information indicating the status of the extension units #1-#4 is transmitted to each of the extension units #1, #2. Further, in S1240, a command indicating that the extension unit #1 and the extension unit #2 are occupied for the internal call is transmitted to the remaining extension units #3, #4. In the present embodiment, in S1230 and S1240, the base unit 10 transmits the identical extension unit information (see FIGS. 3A-3C) to the extension units #1-#4.

Following 1240, in S1250, the base unit 10 judges as to whether an acknowledge command from the extension unit #2 is received. If no acknowledge command is received (S1250: NO), the base unit 10 repeats S1250 and waits for the acknowledge command.

In S1250, if the acknowledge command is received (S1250: YES), in S1260, the base unit 10 forwards the acknowledge command from the extension unit #2 as the called unit to the extension unit #1 as the caller unit. In the present embodiment, in S1260 the base unit 10 transmits the extension unit information (see FIGS. 3A-3C) to the extension unit #1.

Next, in S1270, the base unit 10 establishes an audio path with the extension unit #1 and the extension unit #2. In S1280, a screen for internal call is displayed on the displays 13 of the extension unit #1 and the extension unit #2. Thus, the base unit 10 relays the internal call between the extension unit #1 and the extension unit #2.

During the internal call, in S1310 (see FIG. 14B), it is judged as to whether the base unit 10 receives a disconnection command transmitted from the extension unit #1. If no disconnection command is received (S1310: NO), the base unit 10 repeats S1310 and maintains relaying the internal call.

In S1310, if the disconnection command from the extension unit #1 is received (S1310: YES), in S1320, the base unit 10 disconnects the audio path with the extension units #1 and #2. In S1330, the base unit 10 forwards the disconnection command to the extension unit #2 as the called unit. In S1330, the extension unit information (see FIGS. 3A-3C) is transmitted to the extension unit #2.

Next, in S1340, it is judged as to whether an acknowledge command from the extension unit #2 is received. If no acknowledge command is received (S1340: NO), the base unit 10 repeats S1340 and waits for the acknowledge command from the extension unit #2.

In S1340, if the acknowledge command from the extension unit #2 is received (S1340: YES), in S1350, the base unit 10 forwards the acknowledge command to the extension unit #1, which has transmitted the disconnection command. In S1350, the extension unit information (see FIGS. 3A-3C) is transmitted to the extension unit #1.

Next, in S1360, the base unit 10 displays a screen indicating standby state. Further, in S1370, the base unit 10 transmits a command indicating the extension units #1 and #2 are in standby state to the remaining extension units #3, #4. In S1370, the extension unit information (see FIGS. 3A-3C) is transmitted to the extension units #3, #4. Thus, the base unit 10 enters standby state.

Secondly, an extension-to-extension internal call process (see FIG. 15A) for the extension unit #1 as the caller being performed in parallel with the extension-to-extension internal call process for the base unit 10 will be described.

As the process starts, in S1410, the extension unit #1 judges as to whether the user operates (presses) a key for internal call. If the user has not presses the key (S1410: NO), the extension unit #1 repeats S1410 and maintains the standby state.

In S1410, if the user presses the key for internal call (S1410: YES), in S1420, the extension unit #1 judges as to whether the user selects the extension unit #2 as the called unit. If the selection is not made (S1420: NO), the extension unit #1 repeats S1420 and waits for the selection. In S1420, if the user performs an operation other than selecting the extension unit #2 as the called unit, the extension unit #1 may execute a process corresponding to the operation, which is not shown. Description of such a process is herein omitted.

Figure 16A:
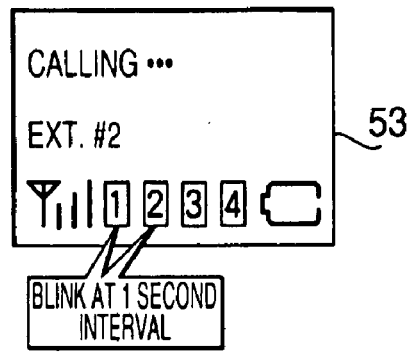
FIGS. 16A-16C show diagrams to illustrate screens shown on the display of the caller extension unit during the extension-to-extension internal call process according to the embodiment of the present invention.

In S1420, if the user selects the extension unit #2 as the called unit (S1420: YES), in S1430, the extension unit #1 displays a screen for internal call on the display 53. FIG. 16A shows a diagram to illustrate the screen to be shown on the display 53 of the extension unit #1 during S1430 in the extension-to-extension internal call process according to the embodiment of the present invention. In the screen on the display 53, the icons indicating the extension unit #1 and the extension unit #2 are blinked at 1 second interval so that the user can recognize the extension units #1, #2 are used in the internal call by the blinks and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1430. Thereafter, in S1440, the extension unit #1 transmits an internal call command to call the extension unit #2 to the base unit 10. The base unit receiving the internal call command will make the affirmative judgment in S1210 as described above.

Thereafter, in S1450, it is judged as to whether the acknowledge command from the extension unit #2 is received via the base unit 10. If no acknowledge command is received (S1450: NO), the extension unit #1 repeats S1450 and waits for the acknowledge command from the extension unit #2.

Figure 16B:
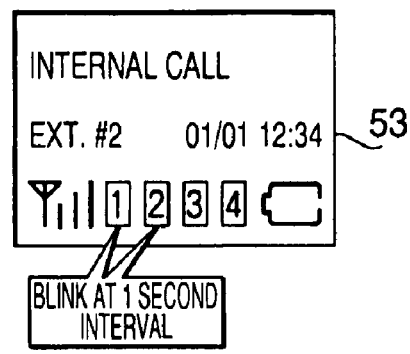

The acknowledge command to be received by the extension unit #1 is forwarded by the base unit 10 in S1260 (see FIG. 14A) as described above. If the acknowledge command is received by the extension unit #1 (S1450: YES), in S1460, the extension units #1 establishes the audio path with the base unit 10, that is, with the extension unit #2. Thereafter, in S1470, a screen for the internal call is displayed on the display 53. Thus, the internal call between the extension unit #1 and the extension unit #2 is achieved. FIG. 16B shows a diagram to illustrate the screen to be shown on the display 53 of the extension unit #1 during S1470 in the extension-to-extension internal call process according to the embodiment of the present invention. In the screen on the display 53, the icons indicating the extension units #1 and #2 are blinked at 1 second interval so that the user can recognize the extension units #1 and #2 are used in the internal call by the blinks and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1470.

During the internal call, in S1510 (see FIG. 15B), it is judged as to whether the user has pressed a key for disconnecting the communication. If the user has not pressed the key (S1510: NO), the extension unit #1 repeats S1510 and maintains the internal call.

In S1510, if the user has pressed the key to disconnect (S1510:YES), in S1520, the extension unit #1 disconnects the audio path with the base unit 10 and, in S1530, transmits a disconnection command to the base unit 10. The disconnection command transmitted in S1530 will be received in the base unit 10 in S1310 (see FIG. 14B) to make the affirmative judgment.

Following S1530, in S1540, it is judged as to whether the acknowledge command transmitted from the base unit 10 is received. When no acknowledge command is received (S1540: NO), the extension unit #1 repeats S1540 and waits for the acknowledge command.

Figure 16C:
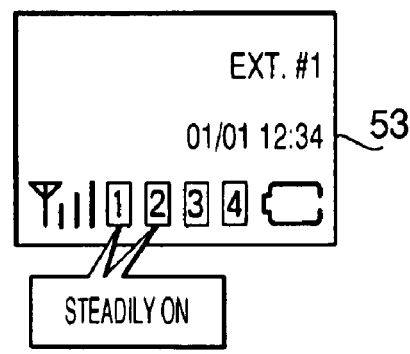

The acknowledge command to be received in S1540 is transmitted from the base unit 10 in S1350 (see FIG. 14B.) When the acknowledge command is received (S1540: YES), in S1550, the extension unit #1 displays a standby screen on the display 53 and enters standby state. FIG. 16C shows a diagram to illustrate the screen to be shown on the display 53 of the extension unit #1 during S1550 in the extension-to-extension internal call process according to the embodiment of the present invention. In the screen on the display 53, the icons indicating the extension units #1 and #2, which have been blinked at 1 second interval, are switched to be steadily ON so that the user can recognize the internal call of the extension units #1 and #2 is terminated and the extension units #1, #2 are now in standby state by the display (steadily ON) and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1550.

Next, an extension-to-extension internal call process (see FIG. 17A) for the extension unit 50 as the called unit (extension unit #) being performed in parallel with the extension-to-extension internal call process for the extension unit #2 will be described.

As the process starts, in S1610, the extension unit #2 in standby state judges as to whether the internal call command from the extension unit #1 is received via the base unit 10. If the internal call command is not received (S1610: NO), the extension unit #2 repeats S1610 and maintains the standby state.

Figure 18A:
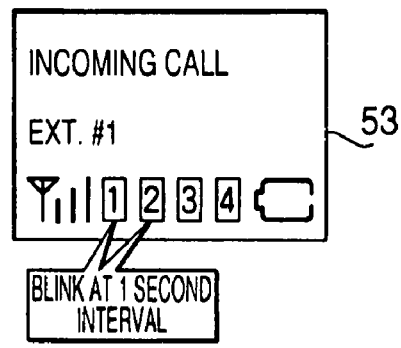
FIGS. 18A-18C show diagrams to illustrate screens shown on the display of the called extension unit during the extension-to-extension internal call process according to the embodiment of the present invention.

If the internal call command is received (S1610: YES), in S1620, the extension unit #2 displays a screen to indicate the incoming internal call on the display 53. FIG. 18A shows a diagram to illustrate the screen to be shown on the display 53 of the extension unit #2 during S1620 in the extension-to-extension internal call process according to the embodiment of the present invention. In the screen on the display 53, the icons indicating the extension unit #1 and the extension unit #2 are blinked at 1 second interval so that the user can recognize the extension units #1, #2 are used in the internal call by the blinks and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1620.

Following S1620, in S1630, the extension unit #2 makes a ring tone, and in S1640, it is judged as to whether the user presses the key for internal call to answer the call. If the user has not pressed the key (S1640: NO), the extension unit #2 repeats S1640 and waits for the user to answer the call. It is noted that the call may not be answered. In such a case, the extension unit #2 may execute a process which is not shown in FIG. 17A, however, description of such a process is herein omitted.

If the user presses the key for internal call (S1640: YES), the extension unit #2 transmits the internal call command to the base unit 10, which thereafter forwards the command to the extension unit #1. The internal call command transmitted in S1650 will be received in the base unit 10 in S1250 (see FIG. 14A) to make the affirmative judgment.

Following S1650, in S1660, it is judged as to whether the acknowledge command transmitted from the base unit 10 is received. When no acknowledge command is received (S1660: NO), the extension unit #2 repeats S1660 and waits for the acknowledge command.

Figure 18B:
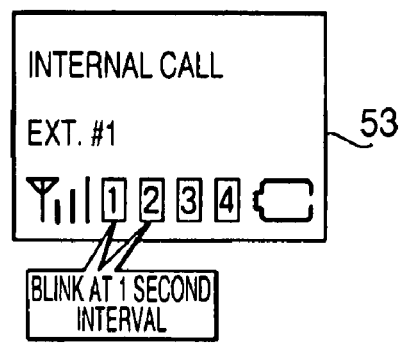

In S1660, if the acknowledge command from the base unit 10 is received (S1660: YES), in S1670, the extension unit #2 stops the ring tone. Thereafter, in S1680, the extension unit #2 establishes the audio path with the base unit 10, i.e., with the extension unit #1, and in S1690, a screen for internal call is displayed on the display 53. Thus, the internal call between the extension unit #2 and the extension unit #1 via the base unit 10 is achieved. FIG. 18B shows a diagram to illustrate the screen to be shown on the display 53 of the extension unit #2 during S1690 in the extension-to-extension internal call process according to the embodiment of the present invention. In the screen on the display 53, the icons indicating the extension units #1 and #2 are blinked at 1 second interval so that the user can recognize the extension units #1 and #2 are used in the internal call by the blinks and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1690.

During the internal call, in S1710 (see FIG. 17B), it is judged as to whether the disconnection command from the extension unit #1 is received via the base unit 10. If no disconnection command is received (S1710: NO), the extension unit #2 repeats S1710 and maintains the internal call.

In S1710, if the disconnection command from the extension unit #1 is received (S1710: YES), in S1720, the extension unit #2 disconnects the audio path with the extension unit #1. In S1730, the extension unit #2 transmits an acknowledgement command to the base unit 10. The acknowledge command transmitted in S1730 will be received by the base unit 10 in S1340 (see FIG. 14B) to make the affirmative judgment. Next, in S1740, the extension unit #2 displays a standby screen on the display 53 and enters standby state.

Figure 18C:
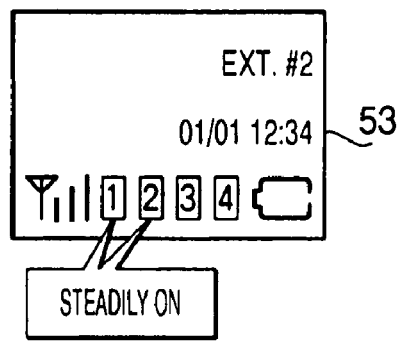

FIG. 18C shows a diagram to illustrate the screen to be shown on the display 53 of the extension unit #2 during S1740 in the extension-to-extension internal call process according to the embodiment of the present invention. In the screen on the display 53, the icons indicating the extension units #1 and #2, which have been blinked at 1 second interval, are switched to be steadily ON so that the user can recognize the internal call of the extension units #1 and #2 is terminated and the extension units #1, #2 are now in standby state by the display (steadily ON) and the other indication in the display 53. Further in the display 53, the icons representing the other extension units #3, #4 are also displayed (steadily ON, blinked, or not displayed) so that the user can recognize the communication status of the extension units #3, #4. It is noted that the status of the extension units #1-#4 can be notified to the user by calling the extension status reporting process (see FIG. 5) in S1740.

Next, a base-to-extension internal call process, which is performed in the base unit 10 and one of the extension units 50 respectively, will be described. FIGS. 19A and 19B show flowcharts of the base-to-extension internal call process in the base unit 10 according to the embodiment of the present invention. FIGS. 20A and 20B show flowcharts of the base-to-extension internal call process in the extension unit 50 according to the embodiment of the present invention.

Firstly, the base-to-extension internal call process in the base unit 10 will be described (see FIG. 19A.) In the following description, the extension unit #1 is referred to as an example of any one of the extension units #1-#4 (extension units 50), but the operations can be similarly performed in any one of the extension units #2-#4.

As the process starts, in S1810, the base unit 10 in standby state judges as to whether the user selects the extension unit #1 as a called unit by, for example, pressing a key for the extension unit #1 in the screen 13 for internal call. If the selection is not made (S1810: NO), the base unit 10 repeats S1810 and maintains the standby state.

If the extension unit #1 is selected (S1810: YES), in S1820, the base unit 10 displays a screen to indicate the internal call on the display 13, and in S1830, transmits an internal call command to the extension unit #1. Further, in S1840, a command indicating that the extension unit #1 is occupied for the internal call is transmitted to the remaining extension units #2-#4. In the present embodiment, in S1830 and S1840, the base unit 10 transmits the identical extension unit information (see FIGS. 3A-3C) to the extension unit #1 in S1830 and to the remaining extension units #2-#4 in S1840 respectively.

Following S1840, in S1850, the base unit 10 judges as to whether an internal call command from the extension unit #1 is not received (S1850: NO), the base unit repeats S1850 and waits for the internal call command from the extension unit #1.

If the internal call command is received (S1850: YES), in S1860, the base unit 10 transmits an acknowledge command to the extension unit #1. In S1860, the extension unit information (see FIGS. 3A-3C) is transmitted to the extension unit #1.

Next, in S1870, the base unit 10 establishes an audio path with the extension unit #1, and in S1880, a screen for internal call is displayed on the display 13. Thus, the internal call between the base unit 10 and the extension unit #1 is achieved.

During the internal call, in S1910 (see FIG. 19B), it is judged as to whether the user has pressed a key for disconnecting the communication. If the user has not pressed the key (S1910: NO), the extension unit #1 repeats S1910 and maintains the internal call.

In S1910, if the user has pressed the key to disconnect (S1910: YES), in S1920, the base unit 10 disconnects the audio path with the extension unit #1 and, in S1930, transmits a disconnection command to the extension unit #1. In 1930, the extension unit information (see FIGS. 3A-3C) is transmitted to the extension unit #1.

Following S1930, in S1940, it is judged as to whether an acknowledge command transmitted from the extension unit #1 is received. When no acknowledge command is received (S1940: NO), the base unit 10 repeats S1940 and waits for the acknowledge command.

When the acknowledge command is received (S1940: YES), in S1950, the base unit 10 displays a standby screen on the display 13. Thereafter, in S196, the base unit 10 transmits a command indicating that the extension #1 is in standby state to the extension units #2-#4. It is noted that, in S1960, the base unit 10 transmits the extension unit information (see FIGS. 3A-3C) to the extension unit #1 and the remaining extension units #2-#4 respectively. Thus, the base unit 10 enters standby state.

Secondly, the base-to-extension internal call process (see FIG. 20A) for the extension unit 50 (extension unit #1) being performed in parallel with the base-to-extension internal call process for the extension unit #1 will be described.

As the process starts, in S2010, the extension unit #1 in standby state judges as to whether the internal call command from the base unit 10 is received. If the internal call command is not received (S2010: NO), the extension unit #1 repeats S2010 and maintains the standby state.

Figure 21A:
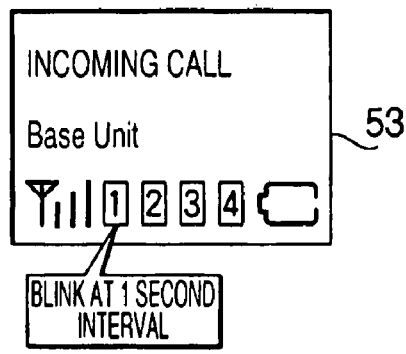
FIGS. 21A-21C show diagrams to illustrate screens shown on the display of the called extension unit during the base-to-extension internal call process according to the embodiment of the present invention.

If the internal call command is received (S2010: YES), in S2020, the extension unit #1 displays a screen to indicate the incoming internal call on the display 53. FIG. 21A shows a diagram to illustrate the screen to be shown on the display 53 of the extension unit #1 during S2020 in the base-to-extension internal call process according to the embodiment of the present invention. In the screen on the display 53, the icon indicating the extension unit #1 is blinked at 1 second interval so that the user can recognize the extension unit #1 is used in the internal call with the base unit 10 by the blinks and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S2020.

Following S2020, in S2030, the extension unit #1 makes a ring tone, and in S2040, it is judged as to whether the user presses the key for internal call to answer the call. If the user has not pressed the key (S2040: NO), the extension unit #1 repeats S2040 and waits for the user to answer the call. It is noted that the call may not be answered. In such a case, the extension unit #1 may execute a process which is not shown in FIG. 20A, however, description of such a process is herein omitted.

If the user presses the key for internal call (S2040: YES), the extension unit #1 transmits the internal call command to the base unit 10. The internal call command transmitted in S2050 will be received in the base unit 10 in S1850 (see FIG. 19A) to make the affirmative judgment.

Following S2050, in S2060, it is judged as to whether the acknowledge command transmitted from the base unit 10 is received. When no acknowledge command is received (S2060: NO), the extension unit #1 repeats S2060 and waits for the acknowledge command.

Figure 21B:
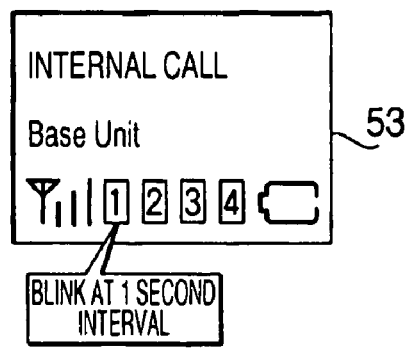

In S2060, if the acknowledge command from the base unit 10 is received (S2060: YES), in S2070, the extension unit #1 stops the ring tone. Thereafter, in S2080, the extension unit #1 establishes the audio path with the base unit 10, and in S2090, a screen for internal call is displayed on the display 53. Thus, the internal call between the extension unit #1 and the base unit 10 is achieved. FIG. 21B shows a diagram to illustrate the screen to be shown on the display 53 of the extension unit #1 during S2090 in the base-to-extension internal call process according to the embodiment of the present invention. In the screen on the display 53, the icon indicating the extension unit #1 is blinked at 1 second interval so that the user can recognize the extension unit #1 and the base unit 10 are used in the internal call by the blinks and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S2090.

During the internal call, in S2110 (see FIG. 20B), it is judged as to whether the disconnection command from the base unit 10 is received. If no disconnection command is received (S2110: NO), the extension unit #1 repeats S2110 and maintains the internal call.

In S2110, if the disconnection command from the base unit 10 is received (S2110: YES), in S2120, the extension unit #1 disconnects the audio path with the base unit 10. In S2130, the extension unit #1 transmits an acknowledgement command to the base unit 10. The acknowledge command transmitted in S2030 will be received by the base unit 10 in S1940 (see FIG. 19B) to make the affirmative judgment. Next, in S2140, the extension unit #1 displays a standby screen on the display 53 and enters standby state.

Figure 21C:
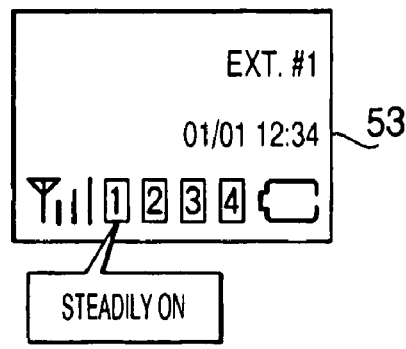

FIG. 21C shows a diagram to illustrate the screen to be shown on the display 53 of the extension unit #1 during S2140 in the base-to-extension internal call process according to the embodiment of the present invention. In the screen on the display 53, the icon indicating the extension unit #1, which has been blinked at 1 second interval, is switched to be steadily ON so that the user can recognize the internal call of the extension unit #1 and the base unit 10 is terminated and the extension unit #1 is now in standby state by the display (steadily ON) and the other indication in the display 53. Further in the display 53, the icons representing the other extension units #2-#4 are also displayed (steadily ON, blinked, or not displayed) so that the user can recognize the communication status of the extension units #2-#4. It is noted that the status of the extension units #1-#4 can be notified to the user by calling the extension status reporting process (see FIG. 5) in S2140.

Figure 22:
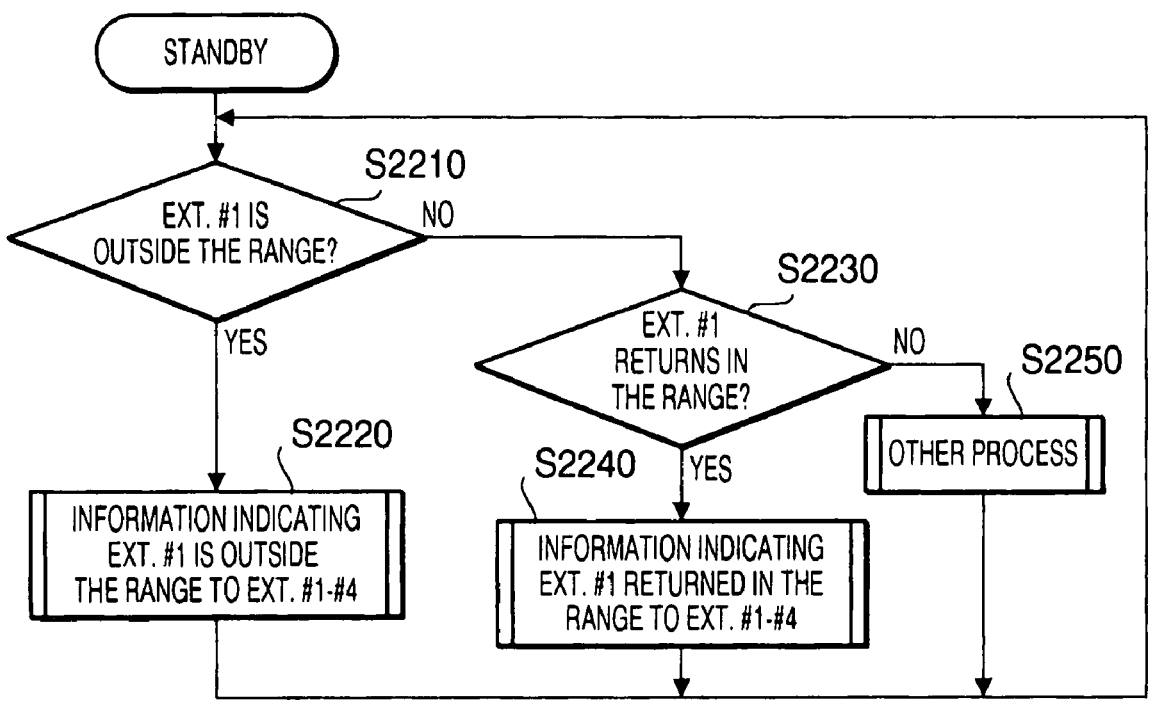
FIG. 22 shows a flowchart to illustrate a range-out status reporting process according to the embodiment of the present invention.

Next, a range-out status reporting process, which is performed in the base unit 10, will be described. FIG. 22 shows a flowchart to illustrate the range-out status reporting process according to the embodiment of the present invention. The range-out status reporting process is constantly repeated by the base unit 10. In the following description, the extension unit #1 is referred to as an example of any one of the extension units #1-#4 (extension units 50), but the operations can be similarly performed in any one of the extension units #2-#4.

As the process starts, in S2210, the base unit 10 judges as to whether the extension unit #1 is outside the service range of the communication system 1. The judgment can be made in a known judging method for cordless telephones and mobile phones. For example, it can be judged that the extension unit #1 is outside the range when no reply to a reply request from the base unit 10 is returned from the extension unit #1 for a predetermined period of time.

In S2210, if it is judged that the extension unit #1 is out of the range (S2210: YES), in S2220, the base unit 10 transmits information indicating the extension unit #1 is out of the range to the remaining extension units #2-#4. Following S2220, the base unit returns to S2210.

In S2210, if it is judged that the extension unit is in the service range of the communication system 1 (S2210: NO), in S2230, the base unit 10 judges as to whether the extension unit #1 has returned in the range. The judgment can be made also in a known judging method for cordless telephones and mobile phones. For example, it can be judged that the extension unit #1 has returned in the range when a reply to a reply request from the base unit 10 is returned from the extension unit #1 within a predetermined period of time after once it was judged that the extension unit #1 is out of the range.

In S2230, if it is judged that the extension unit #1 has returned in the service range (S2230: YES), in S2240, the base unit 10 broadcasts information indicating the extension unit #1 has returned in the range to the extension units #1-#4. Following S2240, the base unit 10 returns to S2210.

In S2230, if it is judged that the extension unit #1 has not returned in the service range (S2230: NO), the base unit 10 performs a process other than S2240 which is not shown. Description of such a process is herein omitted.

In the range-out status reporting process as described above, specifically in S2220 and S2240, the extension unit information (see FIGS. 3A-3C) is broadcasted to the extension units #1-#4.

Therefore, when the extension units #1-#4 are in the service range, each of the extension units #1-#4 receives the extension unit information and executes the extension status updating process (see FIG. 7.) Thus, the icons indicating the extension units #1-#4 are displayed (steadily ON, blinked, or not displayed) in the extension units #1-#4.

Meanwhile, when the extension unit #1 is out of the service range, the extension unit #1 is not capable of receiving the extension unit information. However, the extension unit #1 can be aware that the extension unit #1 itself is outside the service range as the extension unit #1 cannot communicate with the base unit 10. In this case, the extension unit #1 displays the icons indicating each of the extension units #1-#4 (steadily ON, blinked, or not displayed) to notify the user of the status (i.e., out of range) of the extension unit #1 itself. More specifically, the icon indicating the extension unit #1 is blinked at 0.5 second interval, while the icons indicating the remaining extension units #2-#4 are not displayed.

Thus, the remaining extension units #2-#4 receive the status information of the extension unit #1, which is outside the range, and display the icon indicating the extension unit #1 is outside the range by blinking at 0.5 second interval (see FIG. 6, row 1).

As described above, according to the communication system 1, four extension units #1-#4 can be objects to be notified of the presence in the service range, and icons of the objective units are thus specifically displayed (steadily ON or blinked) according to the communication status of itself. Further, icons of absent units (either not installed in the communication system 1 or outside the range) are not displayed (steadily OFF) so that the user can easily recognize presence of the available extension units at a glance.

Further, the extension units 50 present in the service range can notify the user of the communication status (standby, in use for external call, in use for internal call, outside the range) of the other extension units 50 by the indication of the icons, and the user can easily recognize the communication status of all the objective extension units 50.

Furthermore, the extension units 50 can obtain the extension unit information regarding all the extension units 50 installed in the communication system 1 only from the base unit 10. Therefore, even with a plurality of extension units 50, a complicated process to obtain the extension unit information from each of the extension units 50 can be omitted.

Although an example of carrying out the invention have been described, those skilled in the art will appreciate that there are numerous variations and permutations of the communication system that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the extension units 50 in the communication system 1 may not necessarily be cordless telephone, but may be wire-connected telephones as long as internal and external communication can be achieved (for example, wireless or wired communication between the base unit and the extension unit, or wireless or wired communication between the extension unit and an external telephone via the base unit.)

For another example, the extension units can be configured to communicate with each other directly without being relayed by the base unit.

Further, the communication between the extension units and the base unit can be achieved either in analog or digital communication, and a communication protocol can be arbitrarily set.

In the above embodiment, it is assumed that so-called PSTN (public switched telephone network) is used as the telephone line network 100, however, the telephone line network 100 may be the internet when the communication system 1 is configured to be an IP (internet protocol) telephone.

Furthermore, the base unit 10 can be an object to be displayed in the displays 53 of the extension units 50. More specifically, for example, an icon "0" indicating the base unit 10 can be displayed (steadily ON, blinked, or not displayed) as well as the icons "1"-"4" indicating each of the extension units #1-#4.

For another example, the display 13 of the base unit 10 may be configured to display the communication status of the base unit 10 itself and the extension units #1-#4.

In the above embodiment, the status information of each of the extension units #1-#4 is once collected in the base unit 10 to be broadcasted to the extension units #1-#4. However, one of the extension units #1-#4 may be configured to collect and broadcast the information. For example, the extension unit #1 can obtains the information from the extension units #1-#4 and transmits the collected information to the base unit 10, which broadcasts the information to the remaining extension units #2-#4. Further, the collected information may be directly transmitted to each of the extension units #2-#4 and to the base unit 10.

For another example, the icons to be displayed on the displays 53 may be replaced with textual information, or an illuminating element such as an LED can be used for indication (steadily ON, blinked, or not displayed.) Further, the indication may be made in voice (audio) to notify the user of the communication status of the extension units 50 (and the base unit 10.) Furthermore, the indication of the communication status may be made in different colors.

What is claimed is:
1. A communication system, comprising:
   a base unit, which is communicably connected to an external communication device; and
   at least one extension unit, which is communicable with the base unit and with the other extension unit and the external communication device via the base unit, wherein the base unit includes an information collecting system to collect information about a communication status of each of the at least one extension unit in the communication system;

wherein each of the at least one extension unit includes an information obtaining system to obtain the information from the base unit and an indicating system to indicate presence and communication status of each of the at least one extension unit in the communication system based on the obtained information individually on an extension unit basis;

wherein the base unit is provided with a storage system to store the information collected by the information collecting system and an information distributing system to distribute the stored information to each of the at least one extension unit;

wherein the at least one extension unit obtains the stored information from the distributing system of the base unit;

wherein the indicating system includes a plurality of display areas, each of which corresponding to one of the at least one extension unit;

wherein each display area is activated when presence of the corresponding extension unit in the communication system is detected based on the information obtained from the information distributing system;

wherein each display area is inactivated when presence of the corresponding extension unit in the communication system is not detected based on the information obtained from the information distributing system; and wherein the extension unit can be additionally installed in the communication system unless a total number of the extension units exceeds a number of the display areas in the indicating system.

2. The communication system according to claim 1,
wherein the indicating system is capable of indicating status of each of the at least one extension unit, which is on standby to communicate with one of the base unit, the other extension unit in the communication system, and the external communication device.

3. The communication system according to claim 1,
wherein the indicating system is capable of indicating status of each of the at least one extension unit, which is occupied for communicating with one of the base unit, the other extension unit in the communication system, and the external communication device.

4. The communication system according to claim 3,
wherein the indicating system is capable of indicating status of each of the at least one extension unit, which is occupied for internal call to communicate with one of the base unit and the other extension unit in the communication system.

5. The communication system according to claim 3,
wherein the indicating system is capable of indicating status of each of the at least one extension unit, which is occupied for external call to communicate with the external communication device.

6. The communication system according to claim 1,
wherein the indicating system is capable of indicating status of each of the at least one extension unit, which is unreachable to communicate.

7. The communication system according to claim 1,
wherein the indicating system displays an icon, which representing one of the at least one extension unit, in one of the display areas;
wherein the icon is displayed in the display area when presence of the corresponding extension unit in communication is detected; and
wherein the icon is turned off in when presence of the corresponding extension unit in the communication system is not detected.

8. The communication system according to claim 7,
wherein the communication status of the at least one extension unit includes:
standby state, in which the at least one extension unit is ready to communicate with one of the base unit, the other extension unit in the communication system, and the external device;
internally-calling state, in which the at least one extension unit is occupied for internal call to communicate with one of the base unit and the other extension unit in the communication system;
externally-calling state, in which the at least one extension unit is occupied for external call to communicate with the external communication device; and
unreachable state, in which the at least one extension unit is unreachable t
wherein the icon representing one of the at least one extension unit is displayed to be one of steadily on and blinked at a predetermined interval according to the communication status of the at least one extension unit so that the communication status of the at least one extension unit can be distinguished.

9. The communication system according to claim 1,
wherein the at least one extension unit is wirelessly communicable with the base unit, with the other extension unit via the base unit, and with the external communication device via the base unit.

* * * * *

UNITED STATES PATENT AND TRADEMARK OFFICE
CERTIFICATE OF CORRECTION

PATENT NO. : 7,991,410 B2
APPLICATION NO. : 11/898325
DATED : August 2, 2011
INVENTOR(S) : Tsutomu Ukon Page 1 of 1

It is certified that error appears in the above-identified patent and that said Letters Patent is hereby corrected as shown below:

Title Page, Item (75) Inventor
"Tsutomo Ukon, Kuwana (JP)"

should read

--Tsutomu Ukon, Kuwana (JP)--

Signed and Sealed this
Eighteenth Day of October, 2011

David J. Kappos
*Director of the United States Patent and Trademark Office*